(12) United States Patent
Shannon

(10) Patent No.: US 10,807,715 B2
(45) Date of Patent: Oct. 20, 2020

(54) METHOD FOR AUTOMATIC DRONE PACKAGE PICKUP

(71) Applicant: Wing Aviation LLC, Mountain View, CA (US)

(72) Inventor: Trevor Shannon, Mountain View, CA (US)

(73) Assignee: Wing Aviation LLC, Mountain View, CA (US)

( * ) Notice: Subject to any disclaimer, the term of this patent is extended or adjusted under 35 U.S.C. 154(b) by 296 days.

(21) Appl. No.: 15/986,616

(22) Filed: May 22, 2018

(65) Prior Publication Data

US 2019/0359332 A1 Nov. 28, 2019

(51) Int. Cl.
*B64D 1/22* (2006.01)
*B64C 39/02* (2006.01)

(52) U.S. Cl.
CPC .............. *B64D 1/22* (2013.01); *B64C 39/024* (2013.01); *B64C 2201/128* (2013.01); *B64C 2201/141* (2013.01)

(58) Field of Classification Search
CPC ....... H01L 21/67733; B64D 1/22; B64F 1/32; B64C 2201/128
See application file for complete search history.

(56) References Cited

U.S. PATENT DOCUMENTS

| | | | |
|---|---|---|---|
| 2,017,019 A | 10/1935 | Seeley | |
| 8,213,570 B2 | 7/2012 | Panesar et al. | |
| 8,973,860 B2 | 3/2015 | Beard | |
| 9,387,928 B1 | 7/2016 | Gentry et al. | |
| 9,561,852 B1 | 2/2017 | Beaman et al. | |
| 9,573,684 B2 | 2/2017 | Kimchi et al. | |
| 9,630,712 B1 | 4/2017 | Carmack et al. | |
| 9,751,627 B2 | 9/2017 | Bernhardt | |
| 9,969,494 B1* | 5/2018 | Buchmueller | ....... G05D 1/0858 |
| 2015/0317596 A1* | 11/2015 | Hejazi | .................. G06Q 10/083 705/330 |
| 2017/0011340 A1 | 1/2017 | Gabbai | |
| 2017/0073071 A1 | 3/2017 | Salzmann et al. | |

(Continued)

FOREIGN PATENT DOCUMENTS

| CN | 106184757 | 12/2016 |
|---|---|---|
| WO | 2017/019728 A1 | 2/2017 |

OTHER PUBLICATIONS

International Search Report and Written Opinion for International Application No. PCT/US2019/031019 dated Aug. 28, 2019, 14 pages.

*Primary Examiner* — Philip J Bonzell
*Assistant Examiner* — Tye William Abell
(74) *Attorney, Agent, or Firm* — McDonnell Boehnen Hulbert & Berghoff LLP

(57) ABSTRACT

A payload retrieval apparatus including a structure having an outwardly facing portion, a payload support member adapted for having a payload positioned thereon, one or more magnets or a metal positioned on or within the outwardly facing portion of the structure adapted to magnetically engage one or more magnets or a metal positioned on a payload retriever attached to a tether suspended from a UAV, wherein when the payload is positioned on the payload support member, the payload support member is movable to position a handle of the payload adjacent the one or more magnets or the metal on or within the outwardly facing portion of the structure.

20 Claims, 19 Drawing Sheets

(56) References Cited

U.S. PATENT DOCUMENTS

| | | |
|---|---|---|
| 2017/0121023 A1 | 5/2017 | High et al. |
| 2017/0267348 A1 | 9/2017 | Sweeny et al. |
| 2017/0276161 A1* | 9/2017 | Oliver ................... F16B 21/04 |
| 2018/0049576 A1 | 2/2018 | Byers et al. |
| 2018/0072415 A1* | 3/2018 | Cantrell ................. B64D 1/22 |
| 2018/0072418 A1* | 3/2018 | Shannon ................ B64D 1/12 |

* cited by examiner

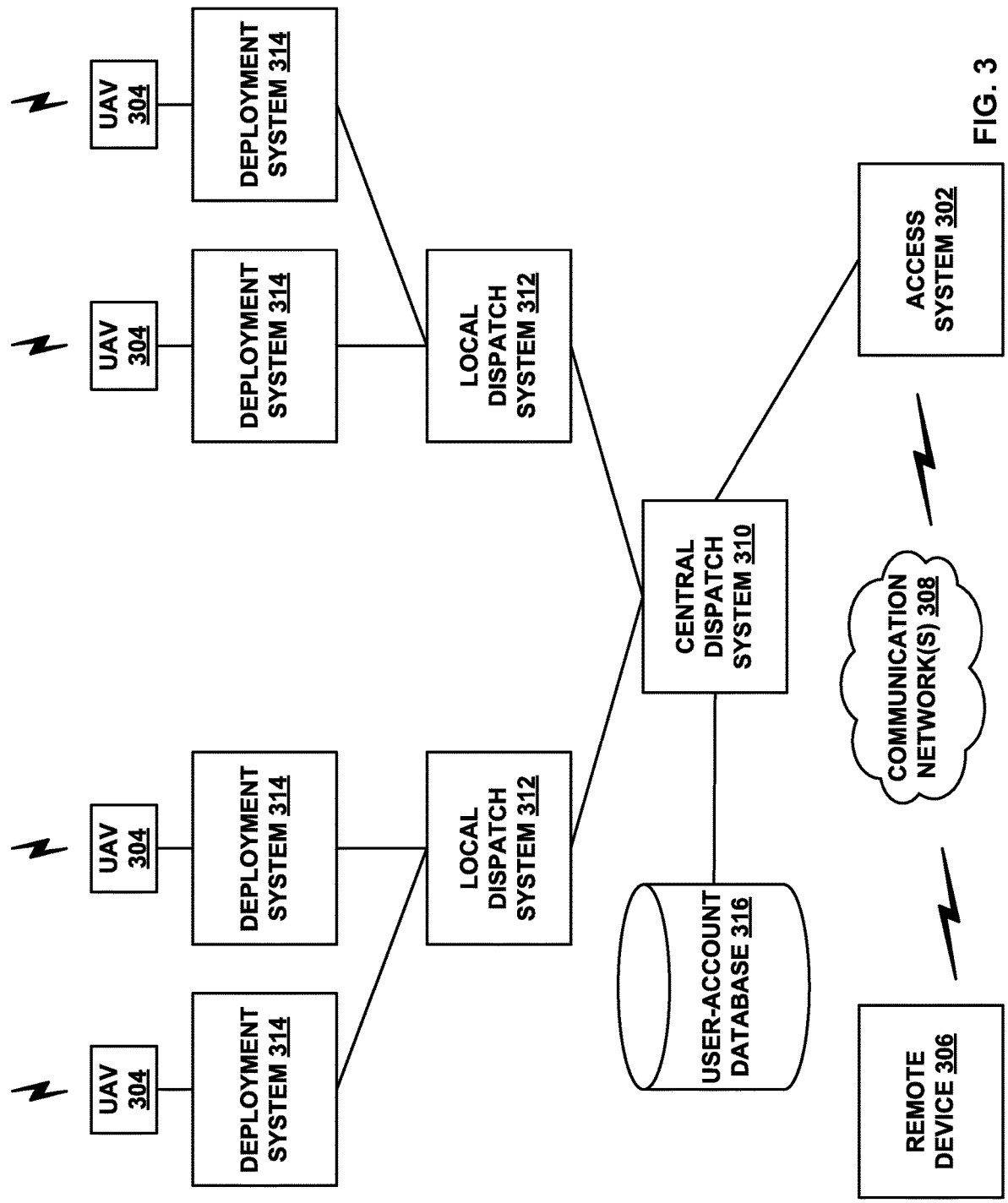

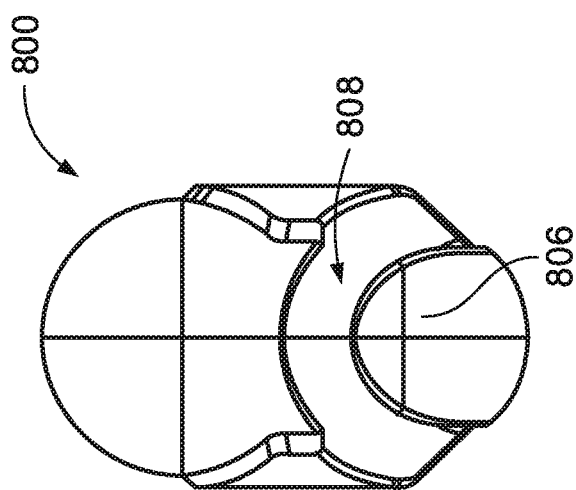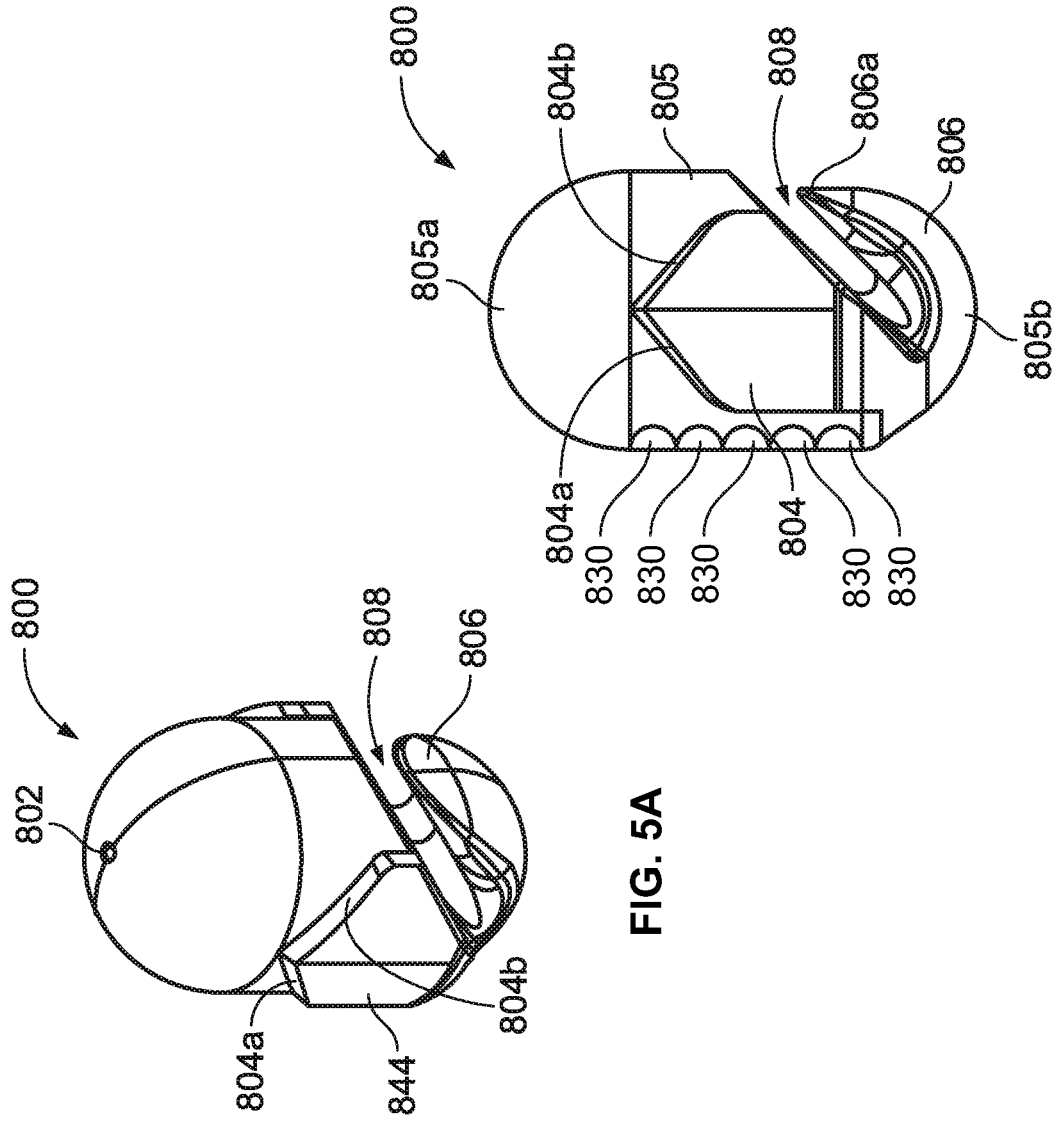
FIG. 5C
FIG. 5B
FIG. 5A

METHOD FOR AUTOMATIC DRONE PACKAGE PICKUP

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

UAVs may be used to deliver a payload to, or retrieve a payload from, an individual or business. In some operations, once the UAV arrives at a retrieval site, the UAV may land or remain in a hover position. At this point, a person at the retrieval site may secure the payload to the UAV at an end of a tether attached to a winch mechanism positioned with the UAV, or to the UAV itself. For example, the payload may have a handle that may be secured to a device at the end of the winch, or a handle that may be secured within the UAV. However, this scenario has a number of drawbacks. In particular, if the UAV is late for arrival at the retrieval site, the person designated for securing the payload to be retrieved by the UAV may have to wait a period of time before the UAV arrives, resulting in undesirable waiting time. Similarly, if the UAV arrives and the person designated to secure the payload to be retrieved to the UAV is delayed or fails to show up, the UAV may have to wait in a hover mode or on the ground until the designated person arrives to secure the payload to the UAV, resulting in undesirable delay and expenditure of energy by the UAV as the UAV waits for the designated person to arrive, and also resulting in undesirable delay in the subsequent delivery of the payload at a delivery site.

As a result, it would be desirable to provide for the automated pickup of a payload by the UAV, where the UAV may automatically pick up the payload without the need for a designated person to secure the payload to the UAV at the retrieval site. Such automated pickup of the payload by the UAV would advantageously eliminate the need for a designated person to secure the payload to the UAV and eliminate potential delays associated with the late arrival of the UAV or designated person at the retrieval site

SUMMARY

The present embodiments advantageously provide an apparatus, system, and method for automatic payload retrieval at a payload retrieval site. The present embodiments are directed to a payload retrieval apparatus that includes a structure having an outwardly facing portion with one or more magnets positioned thereon, that are adapted for magnetic engagement with a payload retriever attached to a tether suspended from a UAV. The payload retriever is lowered until one or more magnets or a metal on the payload retriever become magnetically engaged with the magnets positioned on the outwardly facing portion of the structure, and the payload retriever includes a slot with a hook or lip positioned underneath the slot. A payload support member is provided upon which a payload may be positioned. The payload support member and payload thereon is moved towards the payload retriever until a handle of the payload is moved into the slot of the payload retriever with the hook or lip of the payload retriever extending through an aperture in the handle of the payload. Once the handle of the payload is secured to the payload retriever, the UAV may winch the payload retriever upwardly towards the UAV thereby breaking the magnetic engagement with the outwardly facing portion of the structure and the payload retriever, and payload suspended beneath the UAV. The payload may then be winched upwardly into engagement with the UAV and the UAV may then fly away to deliver the payload at a payload delivery site.

Upon arriving at a payload delivery site, the payload retriever and attached payload may be lowered to the ground by the winch within the UAV, and once the payload contacts the ground, the payload retriever may be further lowered by the winch and automatically disengage from the handle of the payload. Once the payload retriever is disengaged from the payload, the payload may be winched back up to the UAV, and the UAV may fly to a payload retrieval site to retrieve another payload.

In one aspect, a payload retrieval apparatus is provided that includes a structure having an outwardly facing portion, a payload support member adapted for having a payload positioned thereon, one or more magnets or a metal positioned on or within the outwardly facing portion of the structure adapted to magnetically engage one or more magnets or a metal positioned on a payload retriever attached to a tether suspended from a UAV, wherein when the payload is positioned on the payload support member, the payload support member is movable to position a handle of the payload adjacent the one or more magnets or the metal on or within the outwardly facing portion of the structure In another aspect, a payload retrieval system is provided that includes a payload retrieval apparatus having a structure having an outwardly facing portion, a payload support member adapted for having a payload positioned thereon, one or more magnets or a metal positioned on or within the outwardly facing portion of the structure magnetically engaged with one or more magnets or a metal positioned on a payload retriever attached to a tether suspended from a UAV, the payload retriever having a slot positioned above a hook or lip of the payload retriever, wherein when the payload is positioned on the payload support member, the payload support member is movable to position a handle of the payload into the slot of the payload retriever with the hook or lip of the payload retriever extending through an aperture in the handle of the payload.

In another aspect, a method of retrieving a payload is provided including the steps of (i) providing a payload retrieval apparatus having a structure having an outwardly facing portion, a payload support member, and one or more magnets or a metal positioned on or within the outwardly facing portion of the structure; (ii) positioning a payload having a handle with an aperture therein on the payload support member; (iii) lowering a payload retriever attached to a tether suspended from the UAV, the payload retriever having one or more magnets or a metal adapted for magnetic engagement with the one or more magnets or the metal positioned on or within the outwardly facing portion of the structure; (iv) causing the payload retriever to come into magnetic engagement with the outwardly facing portion of the structure; (v) moving the payload support member to position the handle of the payload into a slot on the payload retriever with the hook or lip of the payload retriever extending through the aperture in the handle of the payload; (vi) causing the payload retriever to move out of magnetic engagement with the outwardly facing portion of the structure; and (vii) causing the payload retriever to move towards the UAV with the payload suspended from the payload retriever.

The present embodiments further provide a system for retrieving a payload by a UAV including means for securing a payload retriever to a payload during a payload retrieval process.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 3 is a simplified block diagram illustrating a UAV system, according to an example.

FIG. 5A is a perspective view of payload retriever 800, according to an example embodiment.

FIG. 5B is a side view of payload retriever 800 shown in FIG. 5A.

FIG. 5C is a front view of payload retriever 800 shown in FIGS. 5A and 5B.

DETAILED DESCRIPTION

Figure 1:
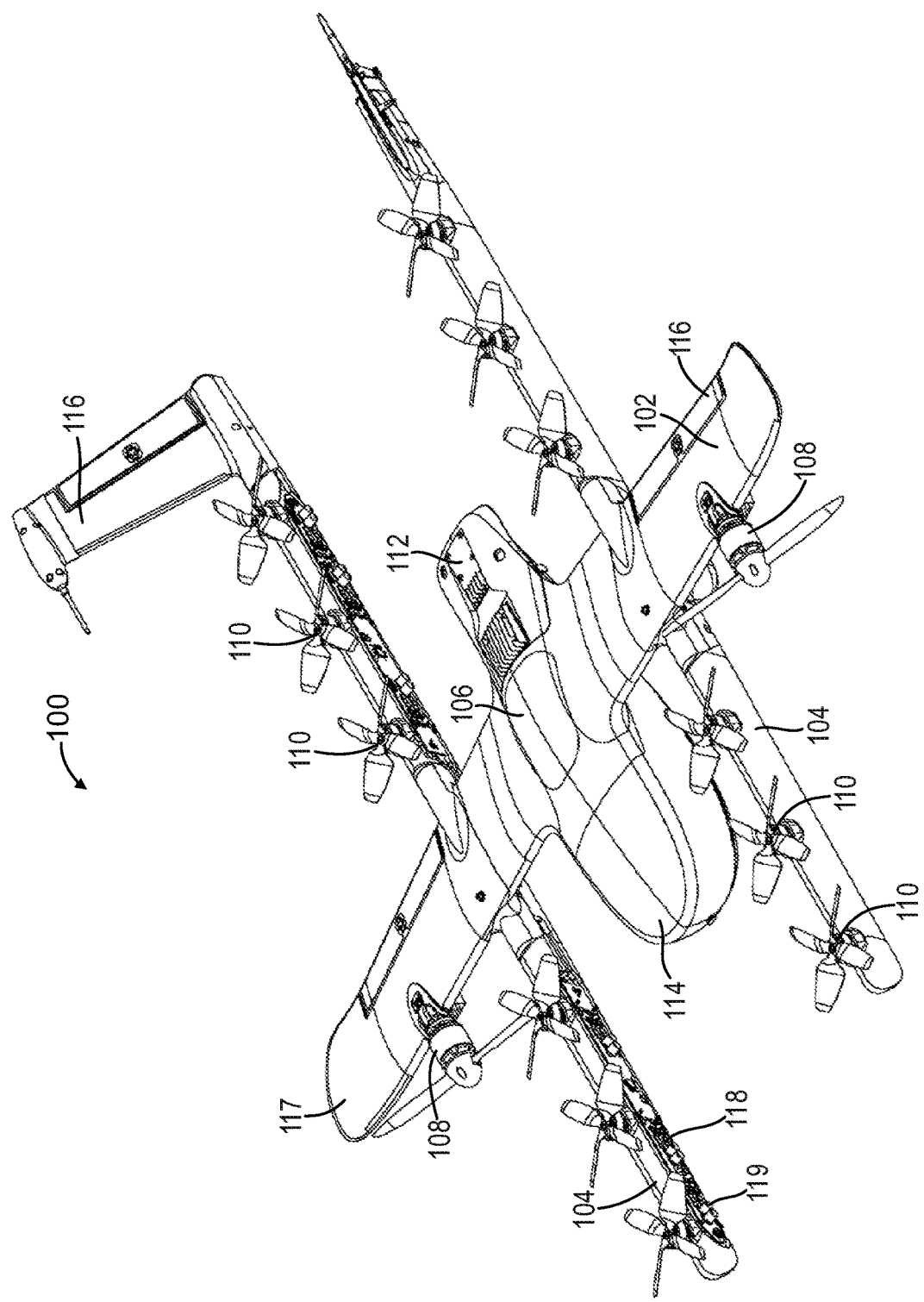
FIG. 1 is an isometric view of an example unmanned aerial vehicle 100, according to an example embodiment.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

The present embodiments advantageously provide an apparatus, system, and method for automatic payload retrieval at a payload retrieval site. The present embodiments are directed to a payload retrieval apparatus that includes a structure having an outwardly facing portion with one or more magnets, or a metal, positioned thereon, that are adapted for magnetic engagement with a payload retriever attached to a tether suspended from a UAV. The payload retriever is lowered until one or more magnets or a metal on the payload retriever become magnetically engaged with the magnets positioned on the outwardly facing portion of the structure. Magnetic engagement may be achieved by having one or more magnets on the outwardly facing portion which magnetically engage with one or more magnets or a metal on the payload retriever. Alternately, a metal may be positioned on the outwardly facing portion of the structure which magnetically engages with one or more magnets positioned on the payload retriever.

The payload retriever includes a slot with a hook or lip positioned underneath the slot. A payload support member is provided upon which a payload may be positioned. The payload support member and payload thereon is moved towards the payload retriever which is magnetically engaged with the outwardly facing portion until a handle of the payload is moved into the slot of the payload retriever with the hook or lip of the payload retriever extending through an aperture in the handle of the payload. The handle may be made of a flexible material that flexes to allow for the handle to move into the slot and allow the hook or lip of the payload retriever to extend through an aperture in the handle of the payload. Once the handle of the payload is secured to the payload retriever, the UAV may winch the payload retriever upwardly towards the UAV thereby breaking the magnetic engagement with the outwardly facing portion of the structure with the payload retriever and payload suspended beneath the UAV. The payload may then be winched upwardly into engagement with the UAV. Once the payload is secured within the payload receptacle, the UAV may fly to a payload delivery site with the payload for subsequent delivery of the payload at the payload delivery site.

In this manner, a person is not required to load a payload onto a payload retriever or a UAV, thereby eliminating any delays that could be caused to a designated loading person by the late arrival of a UAV, and any delays associated with the late arrival of a designated loading person to the payload retrieval site.

The payload retriever may be attached to an end of a tether that is secured to a winch within the UAV. Upon arriving at a payload delivery site, the payload retriever and attached payload may be lowered to the ground by the winch within the UAV, and once the payload contacts the ground, the payload retriever may be further lowered by the winch and automatically disengage from the handle of the payload. Once the payload retriever is disengaged from the payload, the payload retriever may be winched back up towards the UAV, and the UAV may fly to a payload retrieval site to retrieve another payload. Thus, with the automated pickup and delivery of a payload with the payload retriever, no person is required to secure the payload to the payload retriever or UAV at the payload retrieval site, and no person is required to remove the payload from the payload retriever or UAV at the payload delivery site. Accordingly, the payload retrieval system described herein advantageously provides for automatic payload retrieval and delivery, without the need for human involvement.

II. ILLUSTRATIVE UNMANNED VEHICLES

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1 is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Many variations on the illustrated fixed-wing UAV are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. ILLUSTRATIVE UAV COMPONENTS

Figure 2:
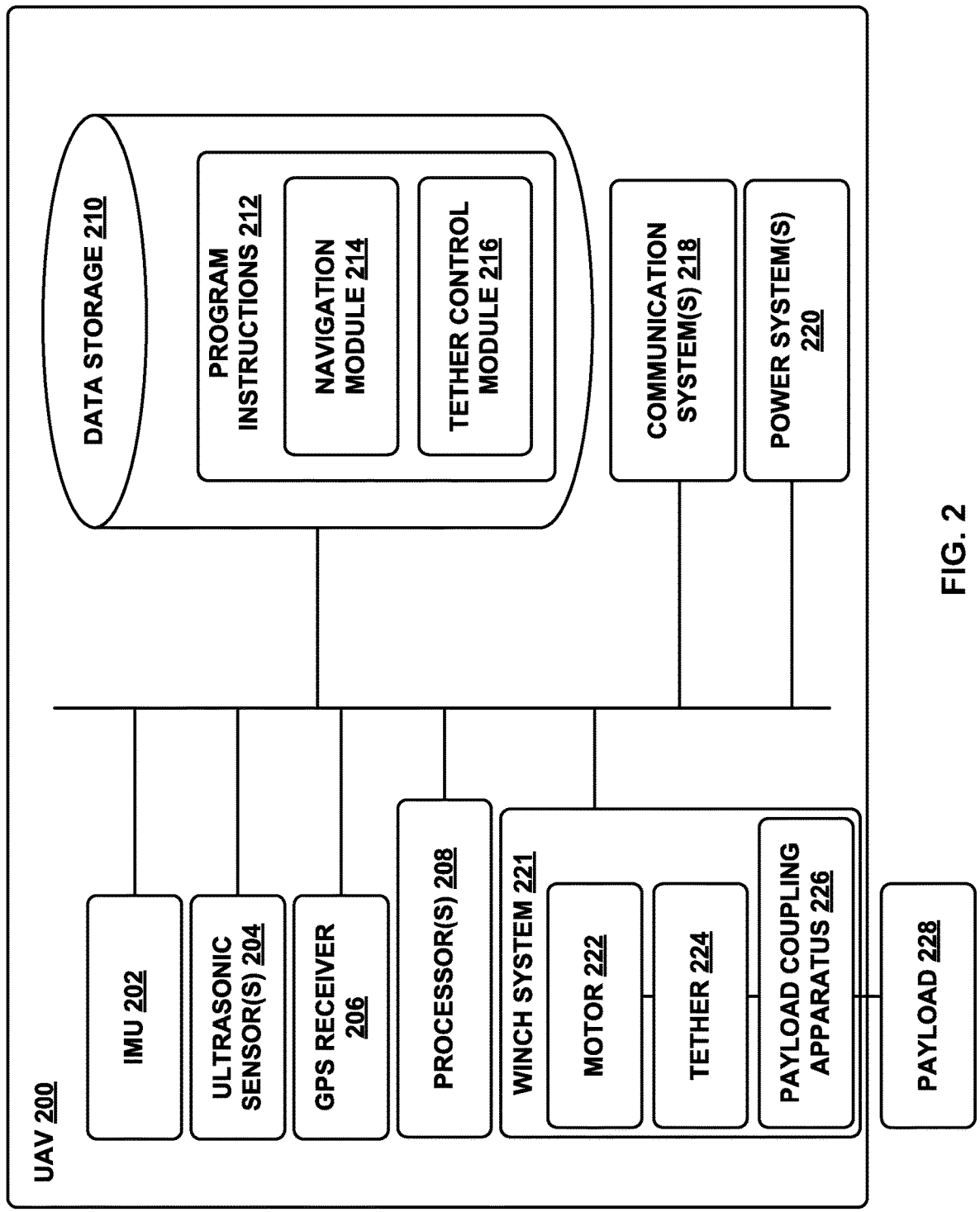
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload coupling apparatus 226 is pressing against the UAV 200 after retracting the tether 224. Other examples are possible as well.

During delivery of the payload 228, the payload coupling apparatus 226 can be configured to secure the payload 228 while being lowered from the UAV by the tether 224, and can be further configured to release the payload 228 upon reaching ground level. The payload coupling apparatus 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. ILLUSTRATIVE UAV DEPLOYMENT SYSTEMS

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. EXAMPLE SYSTEMS AND APPARATUSES FOR PAYLOAD RETRIEVAL AND DELIVERY

A UAV may include various types of payload delivery systems for lowering the payload to a target delivery location. In some cases, the payload may be coupled to a payload retriever attached at an end of the tether, and the UAV may lower the payload to the ground by lowering the tether. The payload retriever may automatically disengage from a handle of the payload after the payload reaches the ground, and the tether and payload retriever may be retracted back to the UAV, and fly to another payload retrieval site.

In addition, the payload retriever may advantageously be used during automated retrieval of a payload. In particular, in the present embodiments, a UAV may position itself above a payload retrieval apparatus that includes a structure having an outwardly facing portion with one or more magnets positioned thereon, that are adapted for magnetic engagement with a payload retriever attached to a tether suspended from a UAV. The payload retriever is lowered until one or more magnets or a metal on the payload retriever become magnetically engaged with the magnets positioned on or within the outwardly facing portion of the structure, and the payload retriever includes a slot with a hook or lip positioned underneath the slot. A payload support member is provided upon which a payload may be positioned. The payload support member and payload thereon is moved towards the payload retriever until a handle of the payload is moved into the slot of the payload retriever with the hook or lip of the payload retriever extending through an aperture in the handle of the payload. Once the handle of the payload is secured to the payload retriever, the UAV may winch the payload retriever upwardly towards the UAV thereby breaking the magnetic engagement with the outwardly facing portion of the structure, with the payload retriever and payload suspended beneath the UAV. The payload may then be winched upwardly into engagement with the UAV and the UAV may then fly away to deliver the payload at a payload delivery site.

Figure 4A:
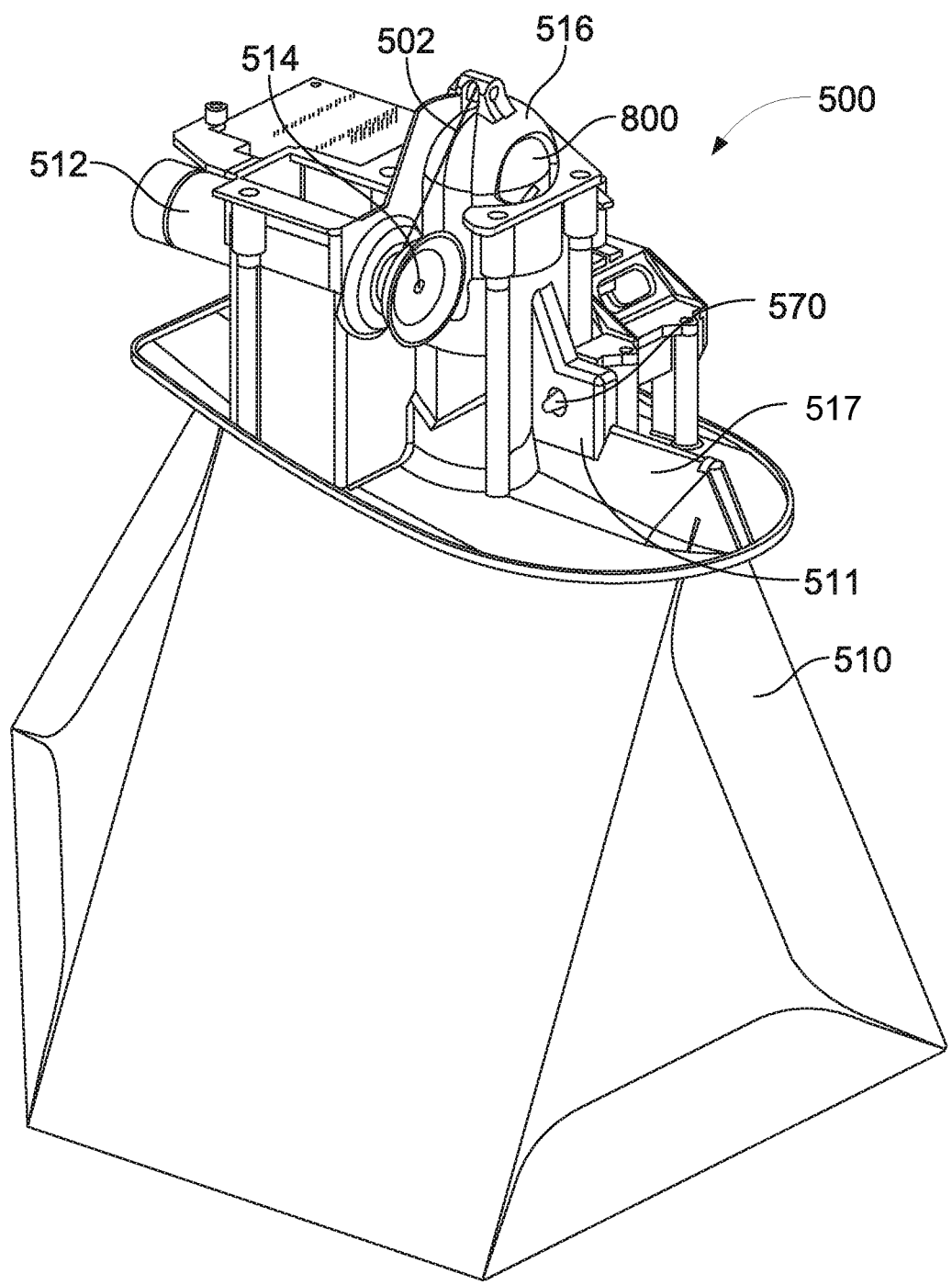
FIG. 4A shows a perspective view of a payload retrieval and delivery apparatus 500 including payload 510, according to an example embodiment.

FIG. 4A shows a perspective view of a payload retrieval and delivery apparatus 500 including payload 510, according to an example embodiment. The payload retrieval and delivery apparatus 500 is positioned within a fuselage of a UAV (not shown) and includes a winch 514 powered by motor 512, and a tether 502 spooled onto winch 514. The tether 502 is attached to a payload retriever 800 positioned within a payload retriever receptacle 516 positioned within the fuselage of the UAV (not shown). A payload 510 is secured to the payload retriever 800. In this embodiment a top portion 517 of payload 510 is secured within the fuselage of the UAV. A locking pin 570 is shown extending through handle 511 attached to payload 510 to positively secure the payload beneath the UAV during high speed flight.

Figure 4B:
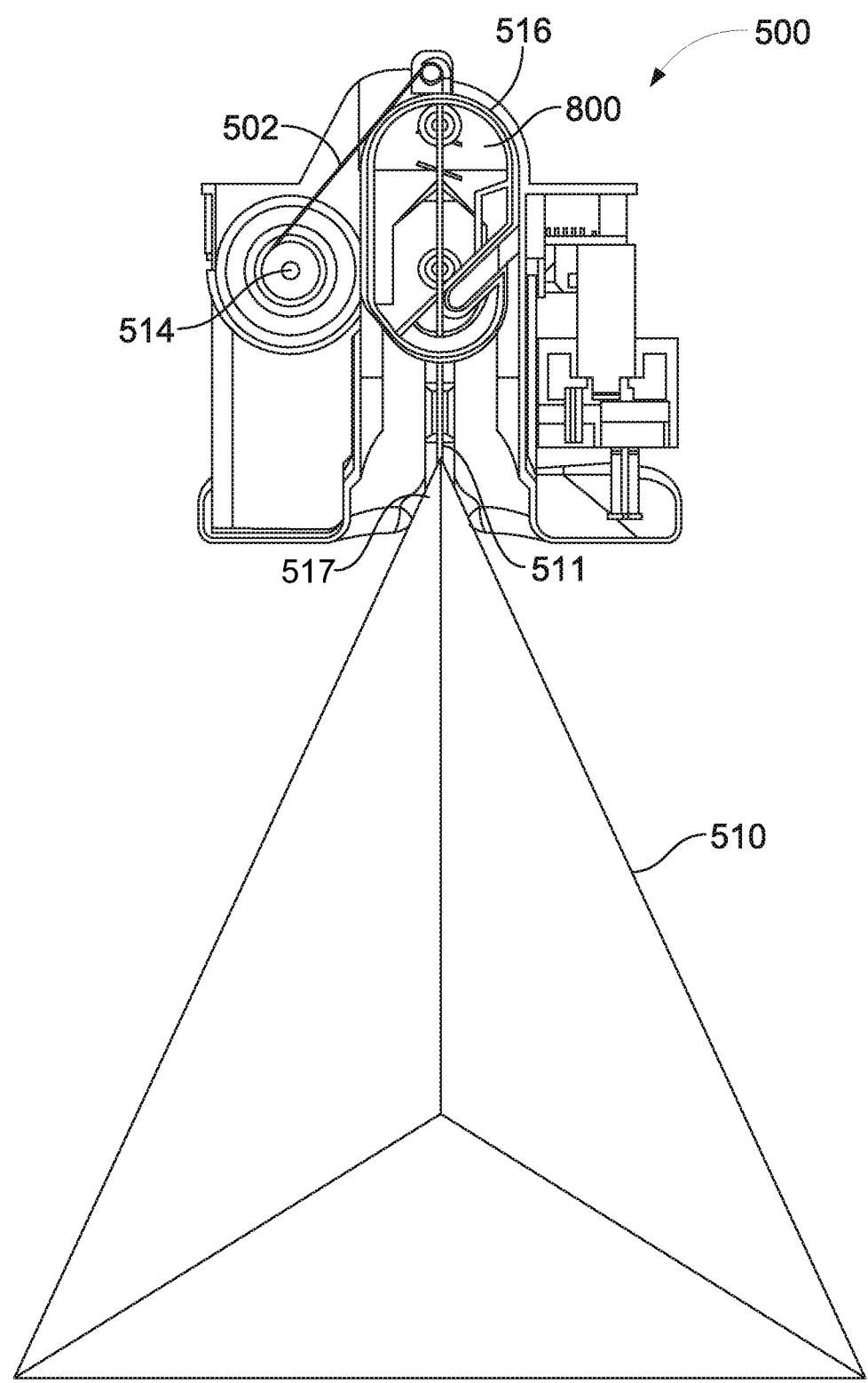
FIG. 4B is a side view of payload retrieval and delivery apparatus 500 and payload 510 shown in FIG. 4A.

FIG. 4B is a cross-sectional side view of payload retrieval and delivery apparatus 500 and payload 510 shown in FIG. 4A. In this view, the payload retriever 800 is shown tightly positioned with the payload retriever receptacle 516. Tether 502 extends from winch 514 and is attached to the top of payload retriever 800. Top portion 517 of payload 510 is shown positioned within the fuselage of the UAV (not shown) along with handle 511.

FIG. 5A is a perspective view of payload retriever 800, according to an example embodiment. Payload retriever 800 includes tether mounting point 802, and a slot 808 to position a handle of a payload handle in. Lower lip, or hook, 806 is positioned beneath slot 808. Also included is an outer protrusion 804 having helical cam surfaces 804a and 804b that are adapted to mate with corresponding cam mating surfaces within a payload retriever receptacle positioned with a fuselage of a UAV.

FIG. 5B is a side view of payload retriever 800 shown in FIG. 5A. Slot 808 is shown positioned above lower lip, or hook, 806. As shown, lower lip or hook 806 has an outer surface 806a that is undercut such that it does not extend as far outwardly as an outer surface 805 above slot 808 so that the lower lip or hook 806 will not reengage with the handle of the payload after it has been decoupled, or will not get engaged with power lines or tree branches during retrieval to the UAV. In this embodiment, payload retriever 800 includes a plurality of magnets 830 on a rear surface thereof that are adapted to engage one or more magnets, or a metal, positioned on a payload retrieval apparatus (described below). Alternately or in addition, payload retriever 800 could include a metal strip adapted to magnetically engage one or more magnets positioned on a payload retrieval apparatus.

FIG. 5C is a front view of payload retriever 800 shown in FIGS. 5A and 5B. Lower lip or hook 806 is shown positioned beneath slot 808 that is adapted for securing a handle of a payload.

Figure 6:
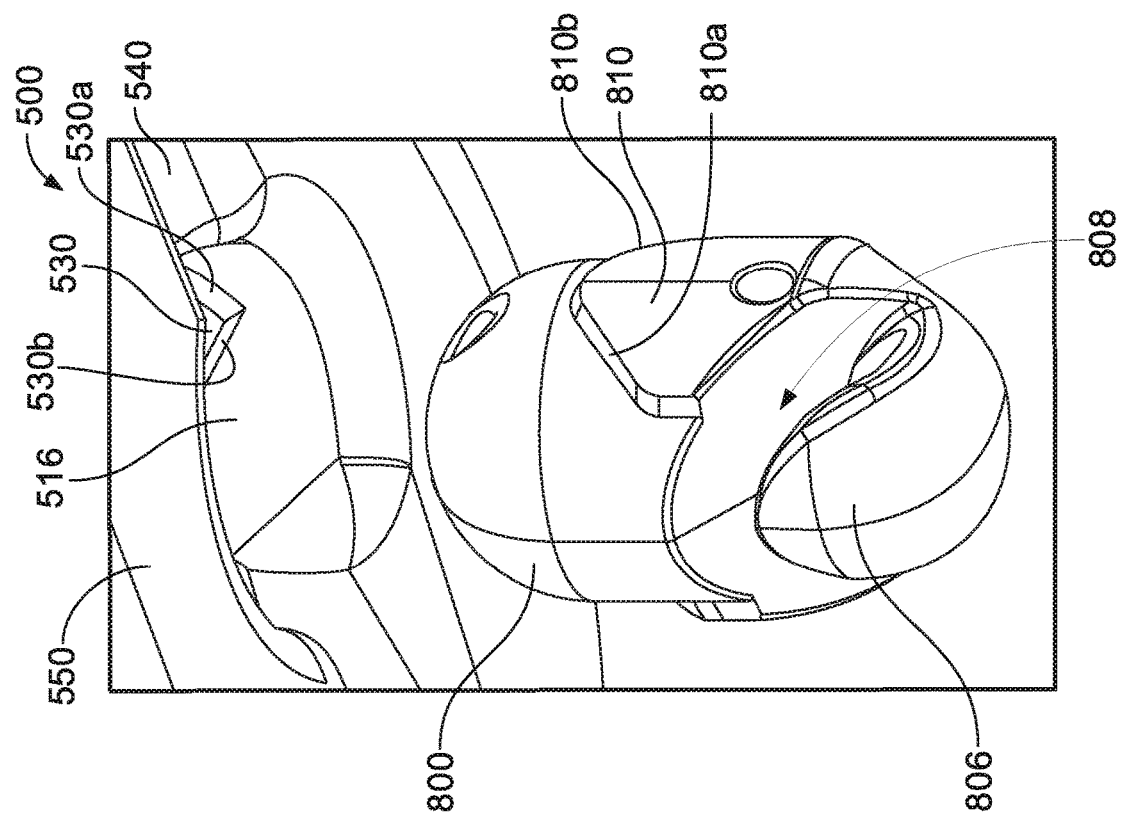
FIG. 6 is a perspective view of payload retriever 800 shown in FIGS. 5A-C, prior to insertion into a payload retriever receptacle positioned in the fuselage of a UAV.

FIG. 6 is a perspective view of payload retriever 800 shown in FIGS. 5A-C, prior to insertion into a payload retriever receptacle 516 positioned in the fuselage 550 of a UAV. As noted previously payload retriever 800 includes a slot 808 positioned above lower lip or hook 806, adapted to receive a handle of a payload. The fuselage 550 of the payload delivery system 500 includes a payload retriever receptacle 516 positioned within the fuselage 550 of the UAV. The payload retriever 800 includes an outer protrusion 810 have helical cammed surfaces 810a and 810b that meet in a rounded apex. The helical cammed surfaces 810a and 810b are adapted to mate with surfaces 530a and 530b of an inward protrusion 530 positioned within the payload retriever receptacle 516 positioned within fuselage 550 of the UAV. Also included is a longitudinal recessed restraint slot 540 positioned within the fuselage 550 of the UAV that is adapted to receive and restrain a top portion of a payload (not shown). As the payload retriever 800 is pulled into to the payload retriever receptacle 516, the cammed surfaces 810a and 810b of outer protrusion 810 engage with the cammed surfaces 530a and 530b within the payload retriever 516 and the payload retriever 800 is rotated into a desired alignment within the fuselage 550 of the UAV.

Figure 7:
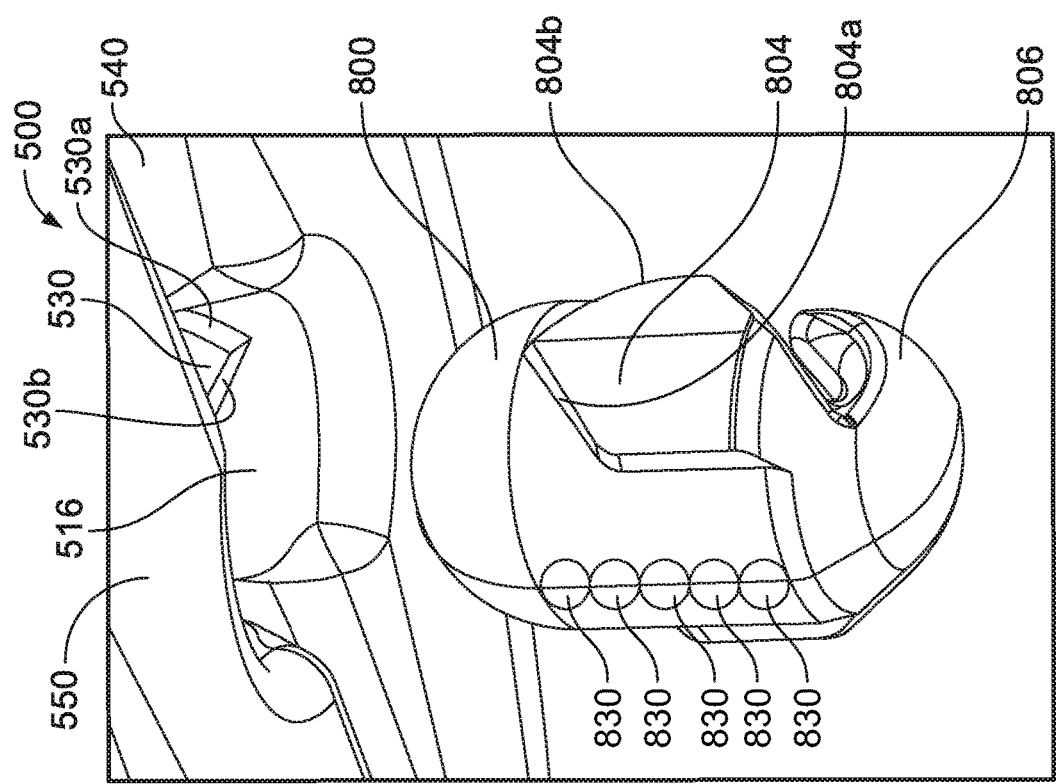
FIG. 7 is another perspective view of payload retriever 800 shown in FIGS. 5A-C, prior to insertion into a payload retriever receptacle positioned in the fuselage of a UAV.

FIG. 7 is another perspective view of an opposite side of payload retriever 800 shown in FIGS. 5A-C, prior to insertion into a payload retriever receptacle 516 positioned in the fuselage 550 of a UAV. As shown, payload retriever 800 includes a lower lip or hook 806. An outer protrusion 804 is shown extending outwardly from the payload retriever having helical cammed surfaces 804a and 804b adapted to engage and mate with cammed surfaces 530a and 530b of inner protrusion 530 positioned within payload retriever receptacle 516 positioned within fuselage 550 of payload retrieval and delivery system 500. It should be noted that the cammed surfaces 804a and 804b meet at a sharp apex, which is asymmetrical with the rounded or blunt apex of cammed surfaces 810a and 810b shown in FIG. 6. In this manner, the rounded or blunt apex of cammed surfaces 810a and 810b prevent possible jamming of the payload retriever 800 as the cammed surfaces engage the cammed surfaces 530a and 530b positioned within the payload retriever receptacle 516 positioned within fuselage 550 of the UAV. In particular, cammed surfaces 804a and 804b are positioned slightly higher than the rounded or blunt apex of cammed surfaces 810a and 810b. As a result, the sharper tip of cammed surfaces 804a and 804b engages the cammed surfaces 530a and 530b within the payload retriever receptacle 516 positioned within the fuselage 550 of payload retrieval and delivery system 500, thereby initiating rotation of the payload retriever 800 slightly before the rounded or blunt apex of cammed surfaces 810a and 810b engage the corresponding cammed surfaces within the payload retriever receptacle 516. In this manner, the case where both apexes (or tips) of the cammed surfaces on the payload retriever apparatus end up on the same side of the receiving cams within the payload retriever receptacle is prevented. This scenario results in a prevention of the jamming of the payload retriever within the receptacle.

In addition, a plurality of magnets 830 are shown positioned on a rear side of the payload retriever 800 that is opposite of the side where the hook or lip 806 and slot 808 are positioned. The plurality of magnets 830 are adapted to magnetically engage the payload retriever 800 to one or more magnets, or a metal, positioned on a payload retrieval apparatus (described below). As noted above, alternately or in addition, payload retriever 800 could include a metal strip adapted to magnetically engage one or more magnets positioned on a payload retrieval apparatus. With the plurality of magnets 830 positioned on the rear side of payload retriever 800 in magnetic engagement with the payload retrieval apparatus, the hook or lip 806 and slot 808 of payload retriever 800 face outwardly and in position to receive a handle of a payload into slot 808 with hook or lip 806 extending through an aperture in the handle of the payload to effect retrieval of the payload.

Figure 8:
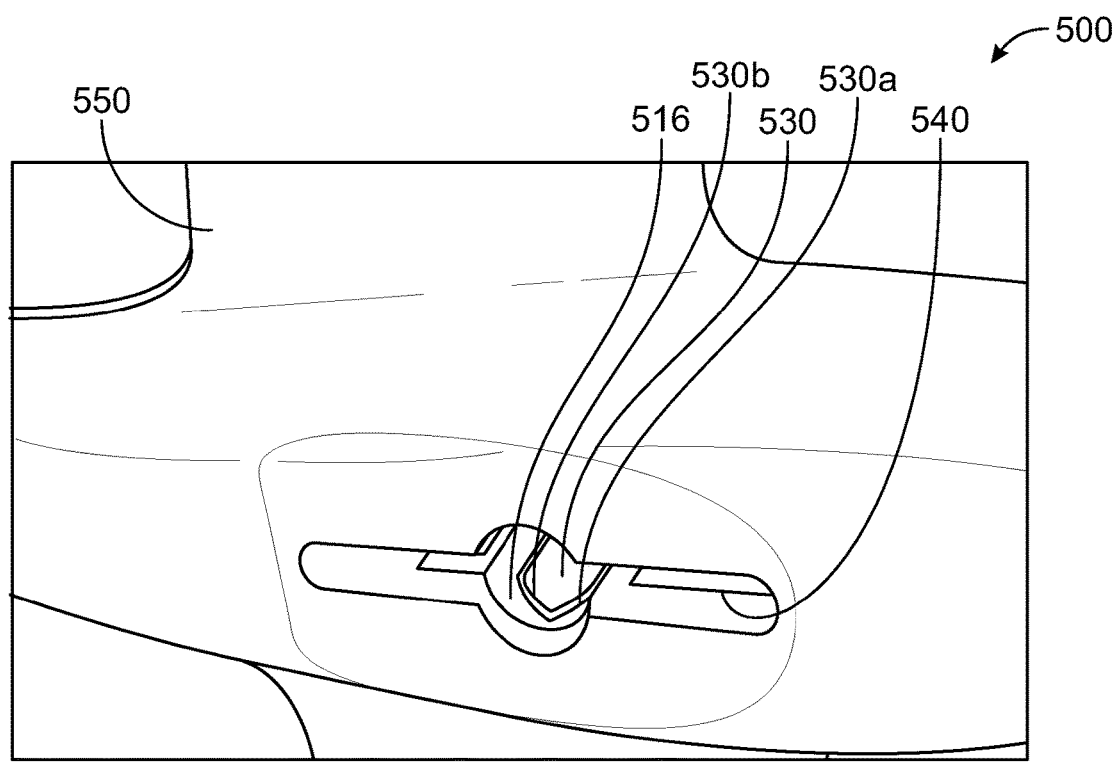
FIG. 8 is a perspective view of a recessed restraint slot and payload retriever receptacle positioned in a fuselage of a UAV.

FIG. 8 shows a perspective view of a recessed restraint slot 540 and payload retriever receptacle 516 positioned in a fuselage 550 of a UAV. In particular, payload retrieval and delivery system 500 includes a fuselage 550 having a payload retriever receptacle 516 therein that includes inward protrusion 530 having cammed surfaces 530a and 530b that are adapted to mate with corresponding cammed surfaces on a payload retriever (not shown). Also included is a longitudinally extending recessed restrained slot 540 into which a top portion of a payload is adapted to be positioned and secured within the fuselage 550.

Figure 9:
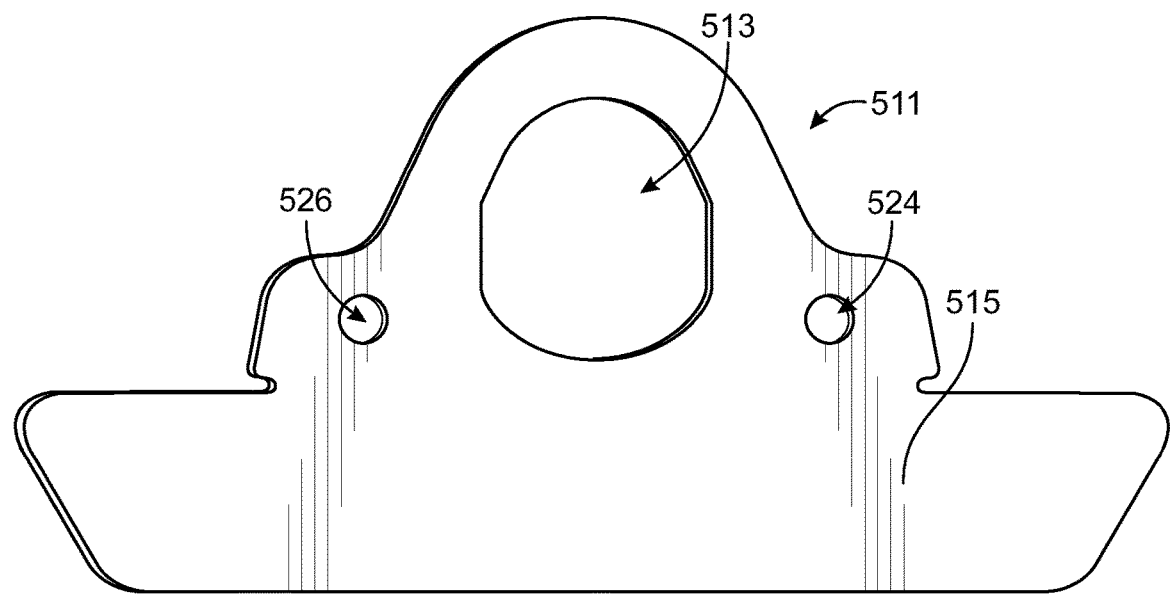
FIG. 9 is a side view of handle 511 of payload 510 having openings 524 and 526 adapted to receive pins for securing the payload within a UAV, according to an example embodiment.

FIG. 9 is a side view of handle 511 of payload 510. The handle 511 includes aperture 513 through which the hook or lip 806 of a payload retriever 800 (shown in FIGS. 5A-7) extends through to suspend the payload during delivery, or during retrieval. The handle 511 includes a lower portion 515 that is secured to the top portion of a payload. Also included are holes 524 and 526 through which are adapted to receive locking pins positioned within the fuselage of a UAV, where the locking pins may extend to further secure the handle and payload in a secure position during high speed forward flight to a delivery location. The handle 511 may be comprised of a thin, flexible plastic material that is flexible and provides sufficient strength to suspend the payload beneath a UAV during forward flight to a delivery site, and during delivery and/or retrieval of a payload. In practice, the handle may be bent or flexed to secure the handle 511 within the slot 808 of the payload retriever 800.

The handle 511 also has sufficient strength to withstand the torque during rotation of the payload retriever into the desired orientation within the payload receptacle, and rotation of the top portion of the payload into position within the recessed restraint slot 540 (shown in FIG. 8).

Figure 10A:
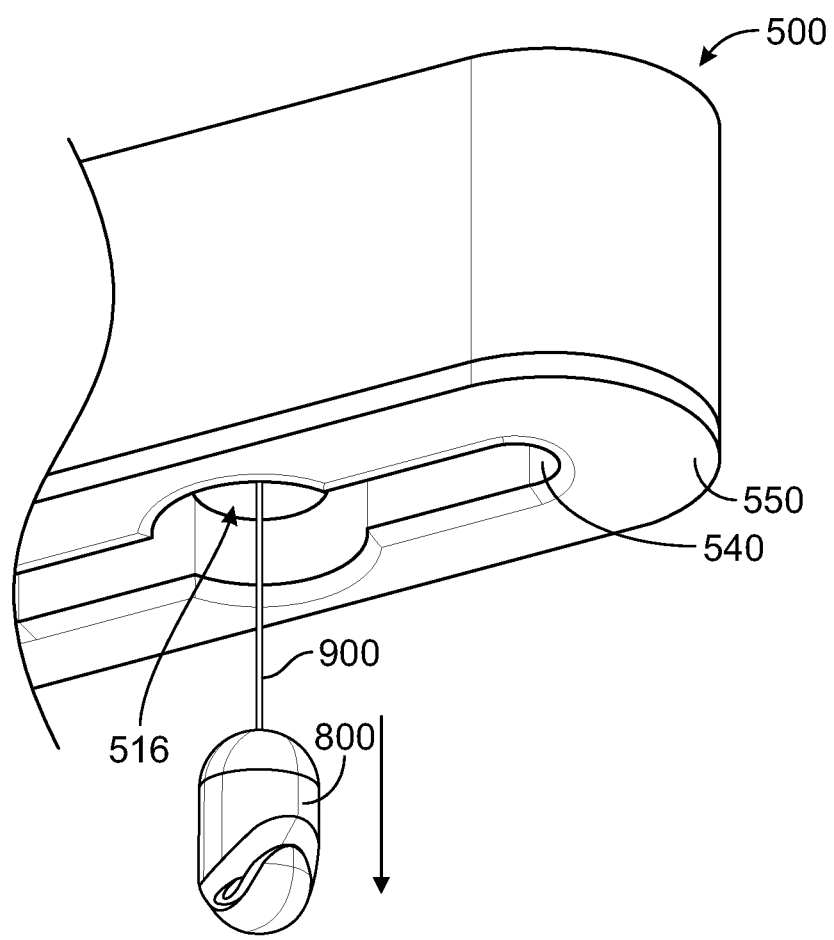
FIG. 10A is a perspective view of payload retriever 800 shown suspended by tether 900 from a UAV, according to an example embodiment.

FIGS. 10A-J show a sequence of steps in the automated retrieval and delivery of a payload. FIG. 10A is a perspective view of payload retriever 800 attached to tether 900 descending from payload retriever receptacle 516 within recessed restraint slot 540 of fuselage 550 of lower portion 500 of a UAV. Although not shown, the payload retriever 800 is being lowered towards a payload retrieval apparatus positioned at a payload retrieval site.

Figure 10B:
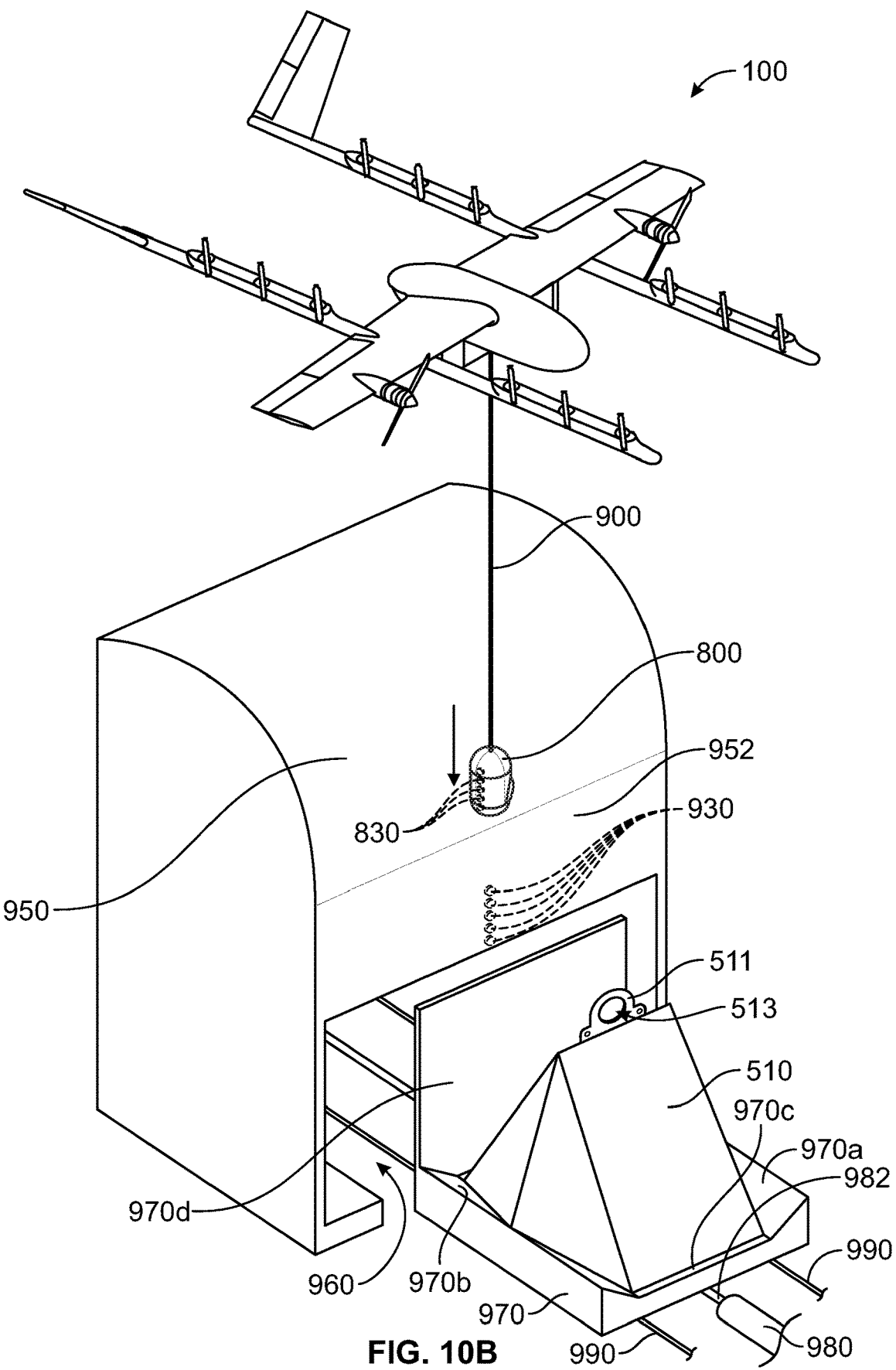
FIG. 10B is a perspective view of payload retriever 800 being lowered by UAV 100 towards payload retrieval apparatus 950, according to an example embodiment.

FIG. 10B is a perspective view of UAV 100 lowering payload retriever 800 attached to tether 900 to payload retrieval apparatus 950. Payload retriever 800 includes a plurality of magnets 830 that are adapted for magnetic engagement with a plurality of magnets 930 positioned on a generally vertical and outwardly facing portion 952 of payload retrieval apparatus 950. As used herein, the term "generally vertical" means+/−30 degrees from vertical.

Payload retrieval apparatus 950 includes a payload support member 970 that is movable towards a cavity 960 within payload retrieval apparatus 950 using a cylinder 980 with cylinder rod 982. Any number of other means may be used to move payload support member 970 such as gear, rack and pinion, pulleys, linear actuators, motors, and the like.

Payload support member 970 may be positioned on guide rails 990 to guide the payload support member 970 in proper alignment. Payload 510 is shown positioned on payload support member 970. Payload 510 includes an upwardly extending handle 511 having aperture 513.

In addition, payload support member 970 may include upwardly angled walls 970a and 970b that serve to properly position payload 510 on upper surface 970c of payload support member 970. In particular, upwardly angled walls 970a and 970b may closely conform with angled lower surfaces 510a of payload 510 as shown in FIGS. 10F and 10G. The cooperation of upwardly angled walls 970a and 970b with angled lower surfaces 510a of payload 510 insure that the bottom of payload 510 is laterally positioned in a desired location on upper surface 970c of payload support member 970. In addition, an upper wall 970d is positioned on the payload support member 970 to insure that the payload 510 is longitudinally positioned in a desired location on upper surface 970c of payload support member 970. In particular, payload 510 may abut upper wall 970d so that the payload 510 is positioned longitudinally on upper surface 970c and prepared for movement of handle 511 of payload 510 into engagement with payload retriever 800.

Figure 10C:
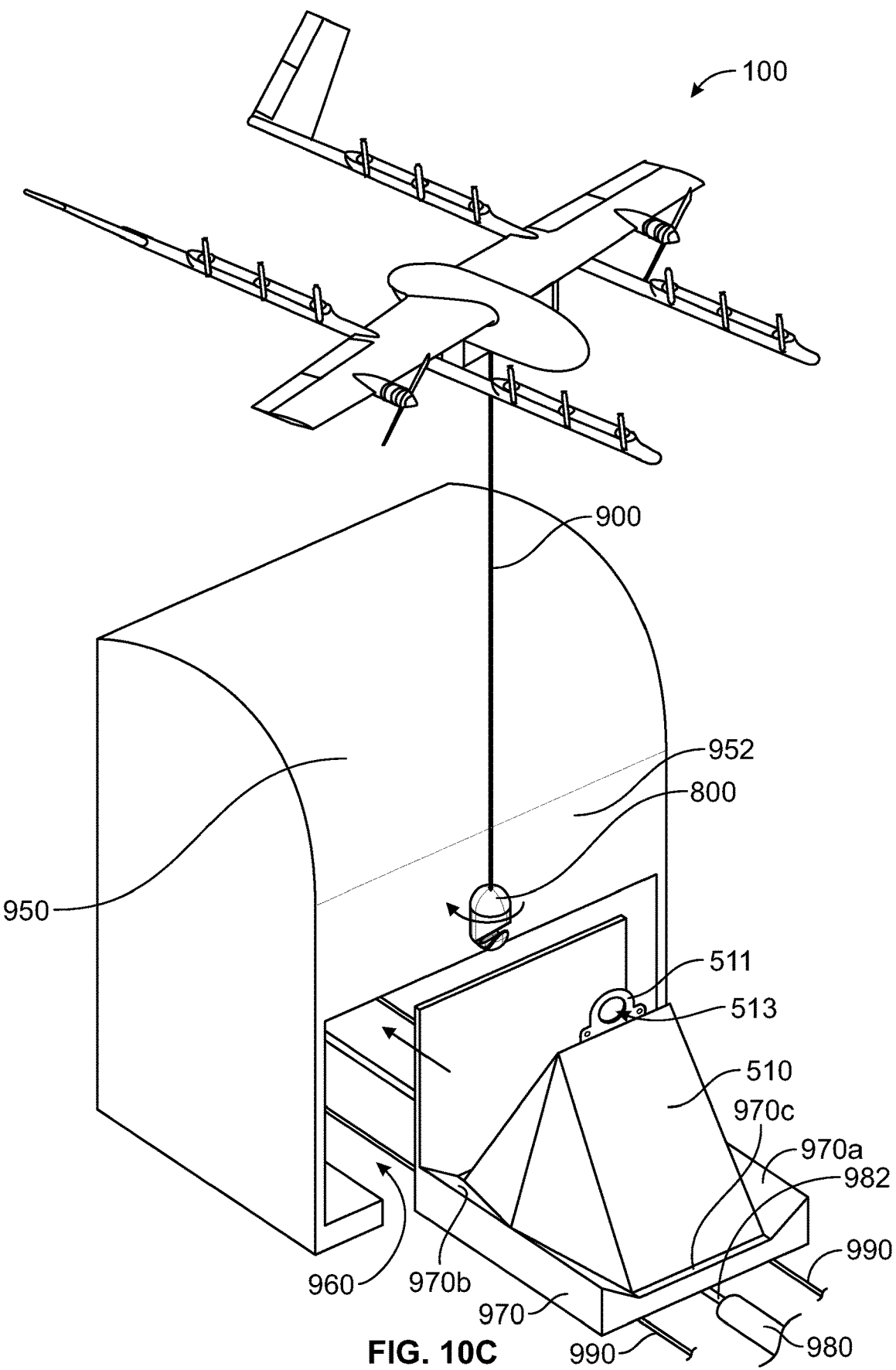
FIG. 10C is a perspective view of payload retriever 800 magnetically engaged with payload retrieval apparatus 950 and payload 510 being moved towards payload retriever 800, according to an example embodiment.

FIG. 10C is a perspective view of payload retriever 800 attached to tether 900 suspended from UAV 100. In FIG. 10C, payload retriever 800 is shown having rotated such that payload retriever 800 is in magnetic engagement with the payload retrieval apparatus 950 with hook or lip 806 and slot 808 of payload retriever 800 facing towards handle 511 of payload 510. In FIG. 10C, cylinder rod 982 of cylinder 980 has begun moving payload support member 970, with payload 510 positioned thereon, towards cavity 960 of payload retrieval apparatus 950.

Figure 10D:
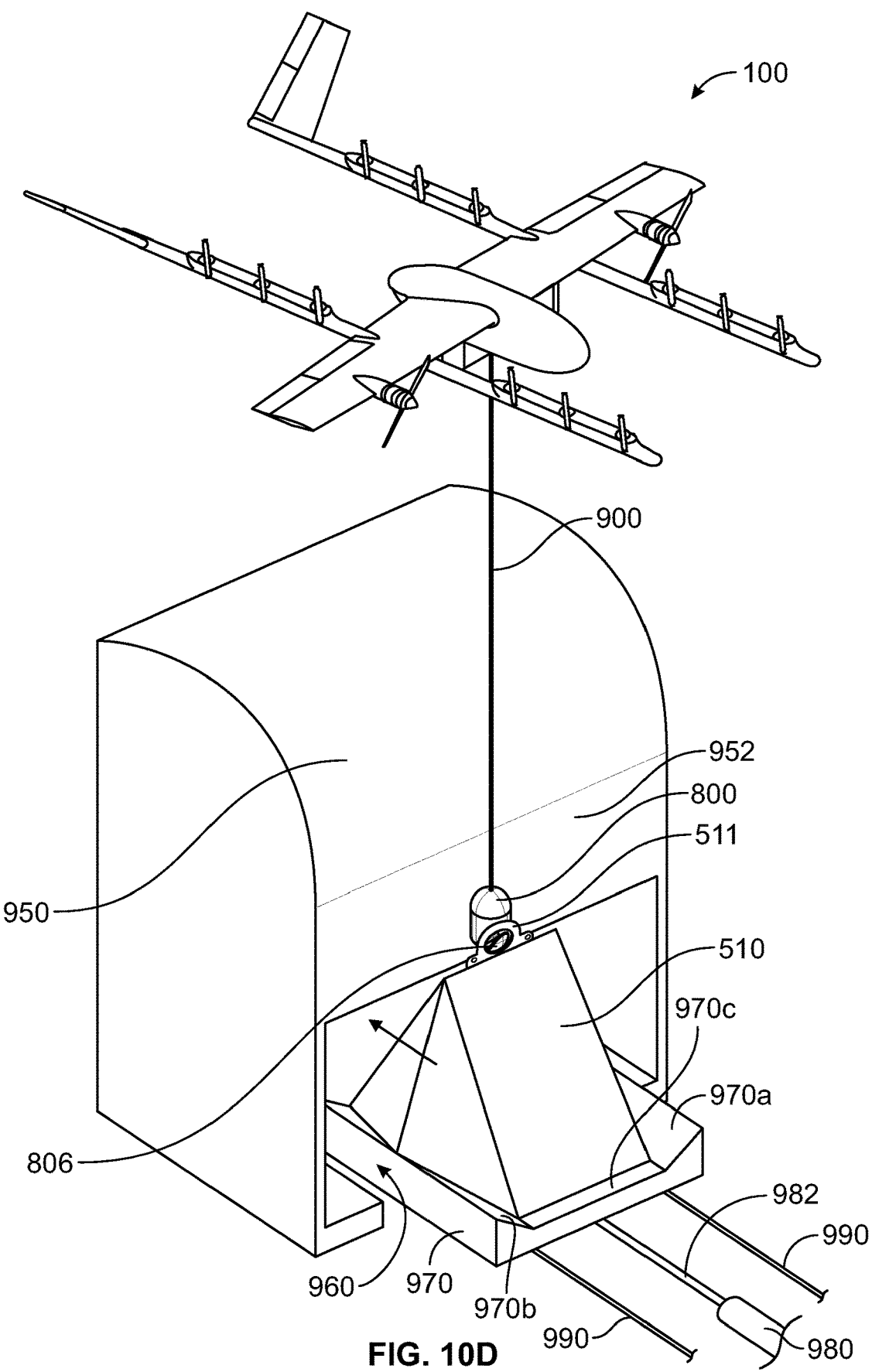
FIG. 10D is a perspective view of handle 511 of payload 510 after a hook or lip 806 of payload retriever 800 has moved through an aperture in handle 511 to secure the payload 510 to the payload retriever 800, according to an example embodiment.

FIG. 10D is a perspective view of payload retriever 800 in magnetic engagement with payload retrieval apparatus 950, where payload support member 970 has been moved towards and partially into cavity 960 of payload retrieval apparatus 950, and payload 510 has also been moved partially into cavity 960 of payload retrieval apparatus 950.

Handle 511 of payload 510 has been moved into position within payload retriever 800 such that hook or lip 806 of payload retriever 800 extends through aperture 513 of handle 511 of payload 510 to secure payload 510 to payload retriever 800. As noted above, handle 511 is made of a flexible material so that handle 511 flexes as it enters the slot 808 of payload retriever 800 to facilitate positioning of hook or lip 806 of payload retriever 800 through aperture 513 of handle 511 of payload 510.

Figure 10E:
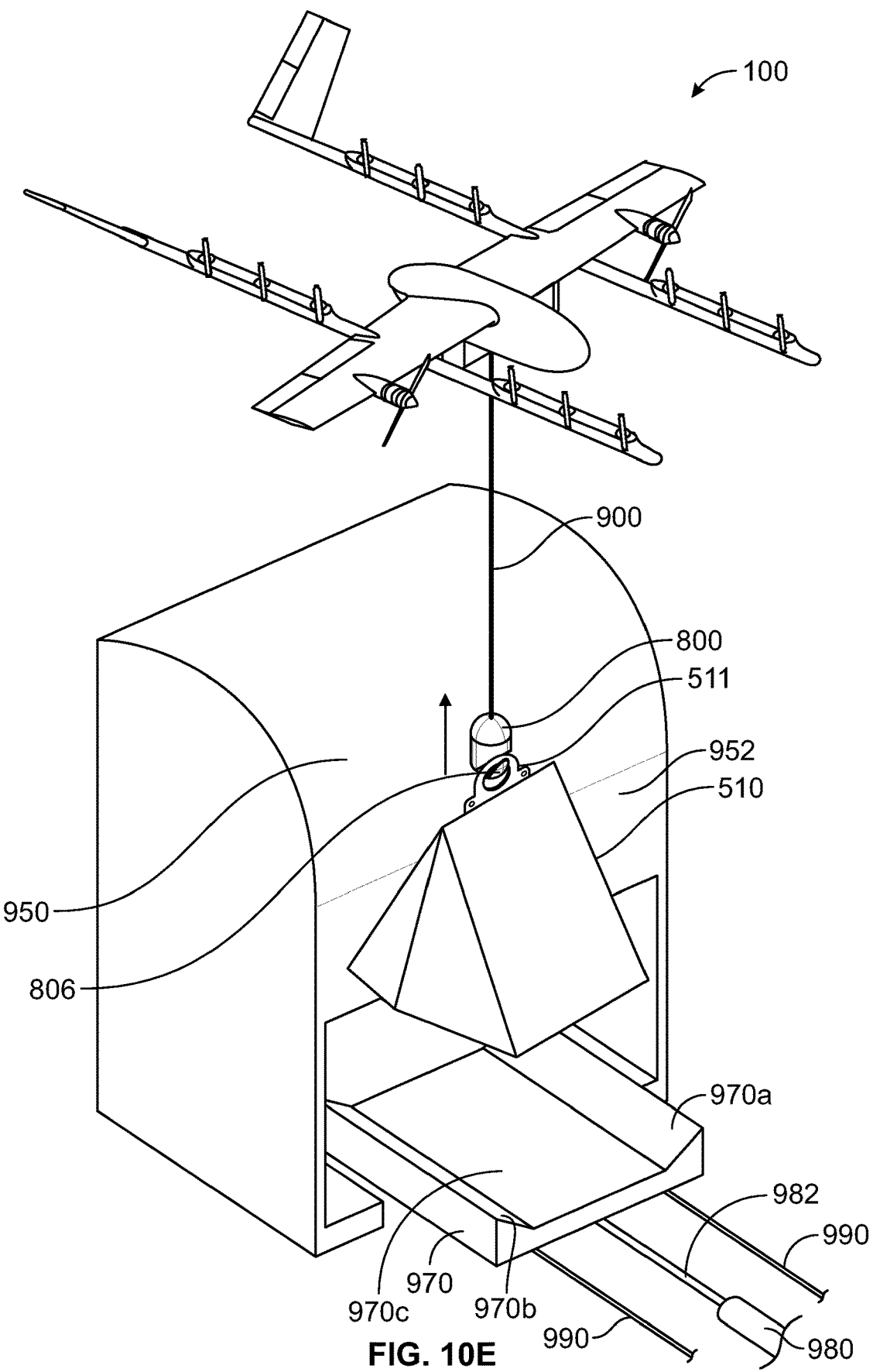
FIG. 10E is a perspective view of payload retriever 800 and secured payload 510 being moved upwardly to UAV 100, according to an example embodiment.
Figure 10F:
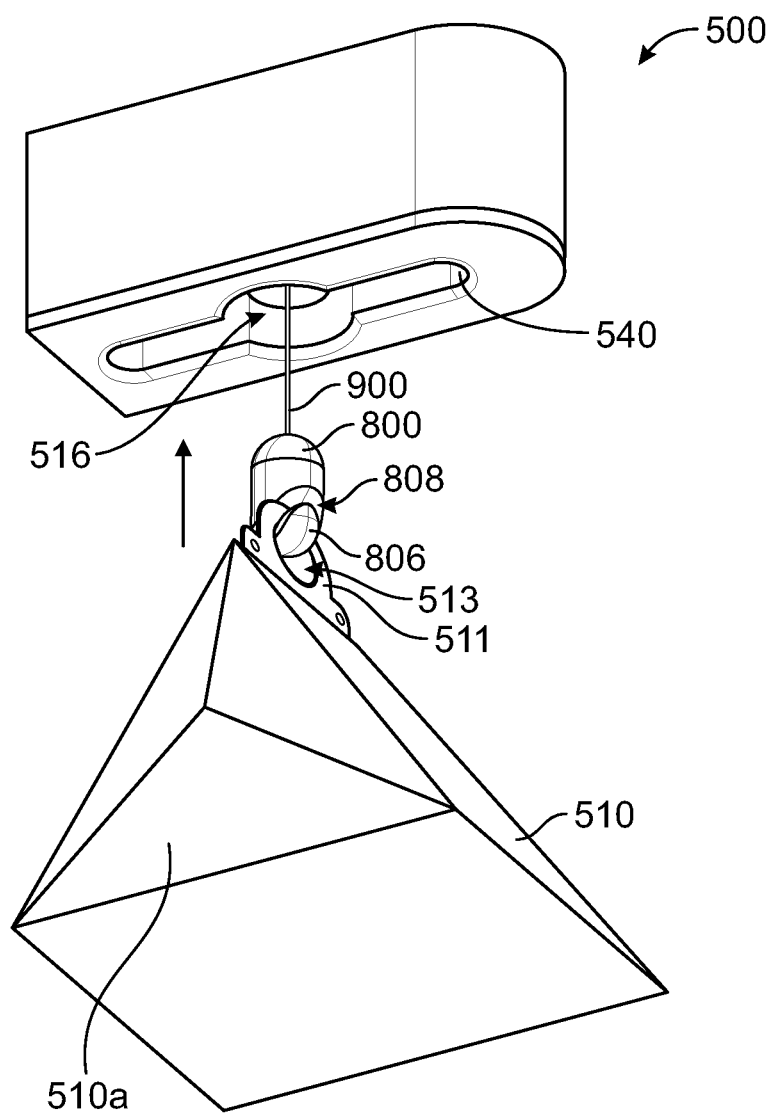
FIG. 10F is a perspective view of payload retriever 800 and payload 510 being moved upwardly towards payload retriever receptacle 516 in a UAV, according to an example embodiment.
Figure 10G:
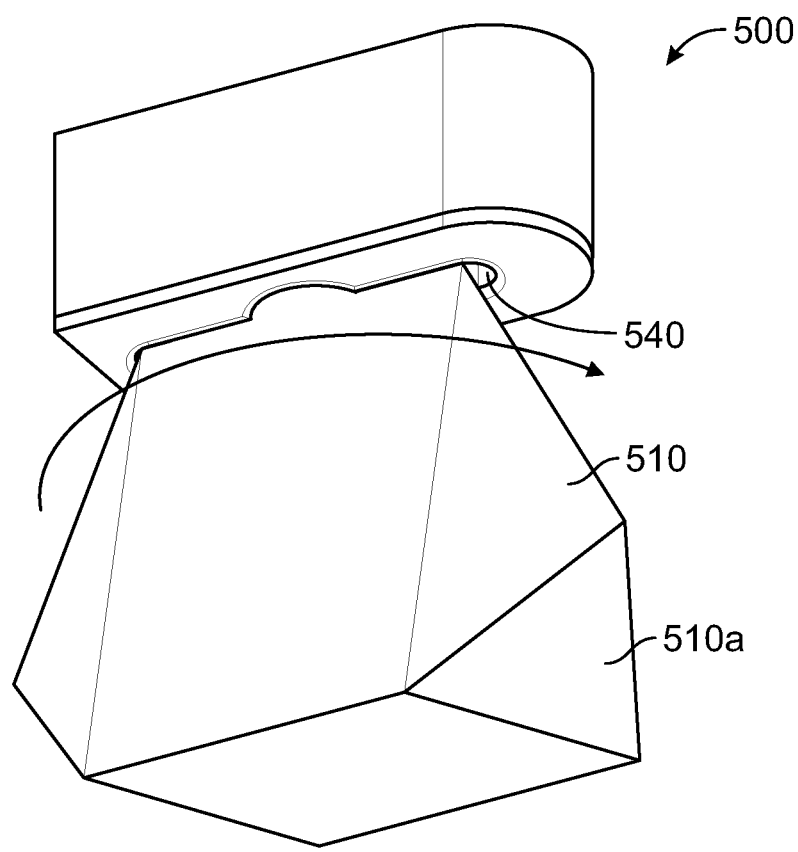
FIG. 10G is a perspective view of payload 510 secured within recessed restraint slot 540 of a UAV, according to an example embodiment.

FIG. 10E is a perspective view of payload retriever 800 attached to tether 900 being winched upwardly towards UAV 100. In FIG. 10E, the upward winching of payload retriever 800 (and payload 510 secured thereto via handle 511) towards UAV 100 has caused the magnetic engagement to break between payload retriever 800 and the magnets positioned on payload retrieval apparatus 950. As shown in FIG. 10F, hook or lip 806 of payload retriever 800 extends through aperture 513 in handle 511 of payload 510 to secure handle 511 within slot 808 of payload retriever 800 such that payload 510 is secured to and suspended from payload retriever 800. Payload retriever 800 and payload 510 are winched upwardly towards payload retriever receptacle 516 and recessed restraint slot 540 in the UAV.

FIG. 10G is a perspective view of payload 510 having rotated into position such that a top end of payload 510 is positioned within recessed restraint slot of the UAV. With payload 510 secured within fuselage 550 of the UAV, the UAV may travel to a delivery site with the payload secured for flight.

Figure 10H:
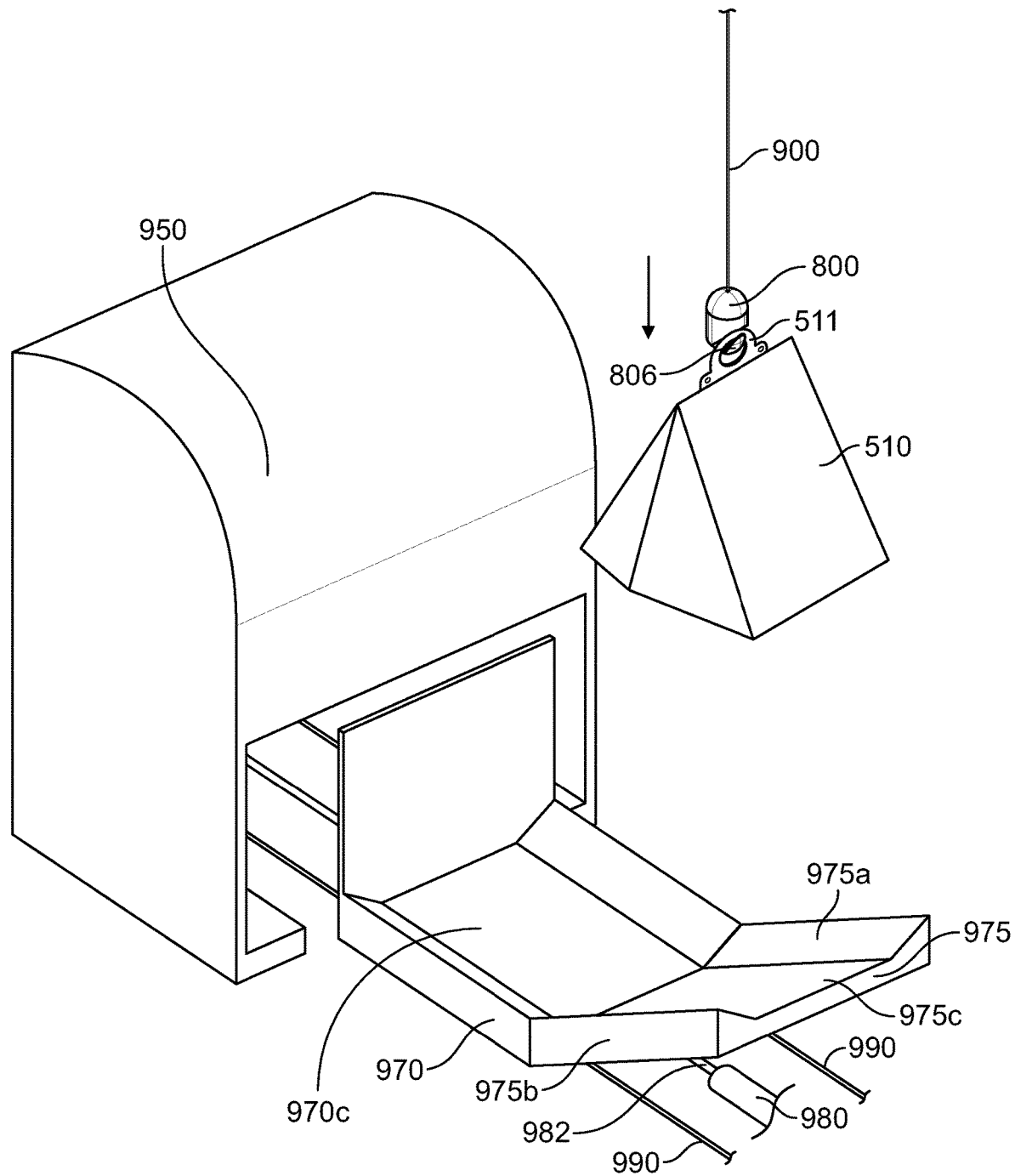
FIG. 10H is a perspective view of payload retriever 800 and payload 510 being lowered onto payload support member 970, according to an example embodiment.

FIG. 10H is a perspective view of payload 510 suspended from payload retriever 800 and tether 900 being lowered to payload support member 970. As payload 510 is lowered to payload support member 970, hook or lip 806 of payload retriever 800 remains extended through aperture 513 in handle 511 of payload 510. In addition, payload support member 970 advantageously includes a sloped chute 975 that serves to guide payload 510 into a desired position on upper surface 970c of payload support member 970. Sloped chute 975 includes angled walls 975a and 975b that are adapted to engage angled lower surfaces 510a (shown in FIGS. 10G and 10H) to properly position payload 510 into a desired location on upper surface 970c of payload support member 970.

Figure 10I:
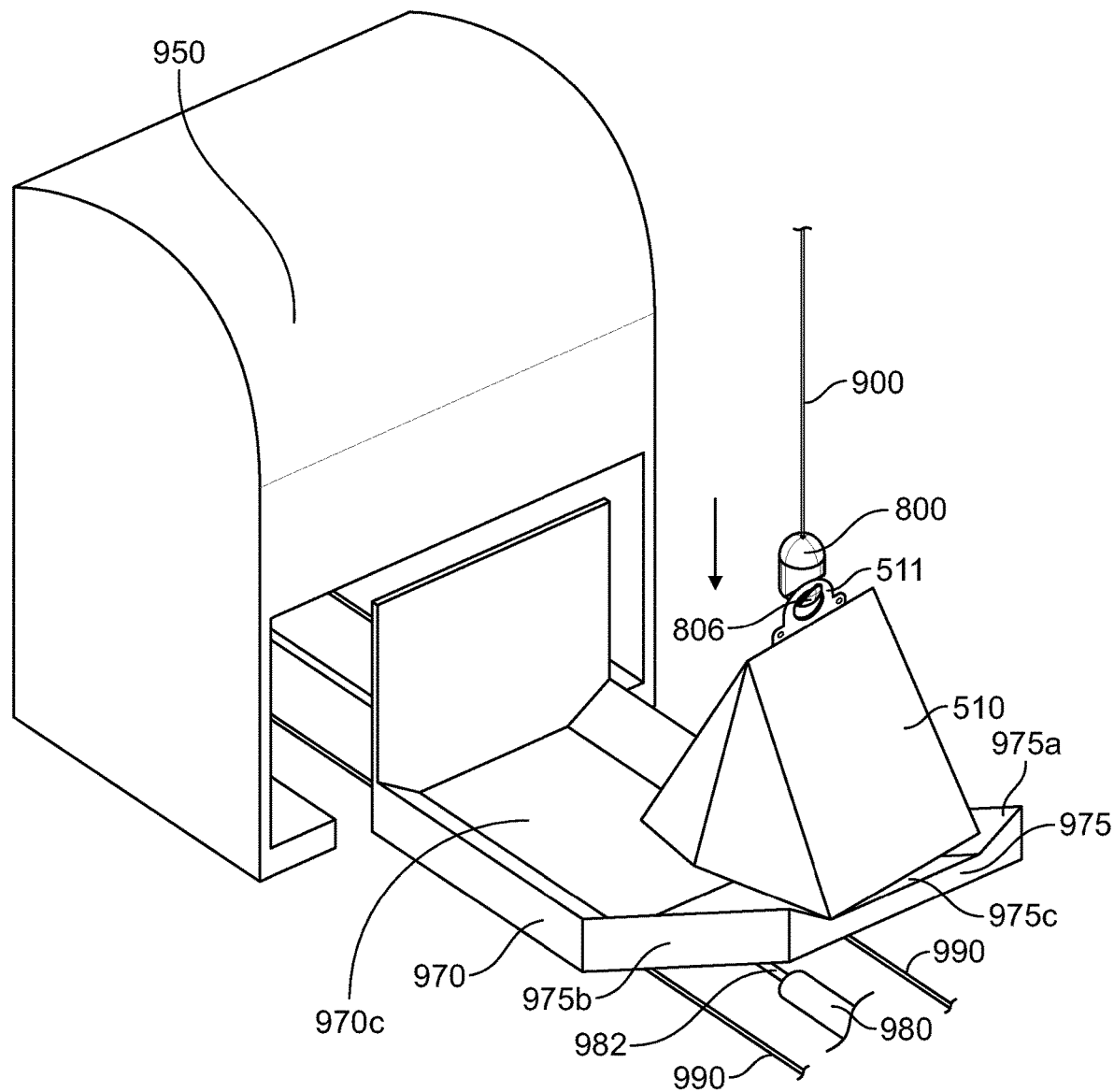
FIG. 10I is a perspective view of payload 510 landing on payload support member 970 while still secured to payload retriever 800.
Figure 10J:
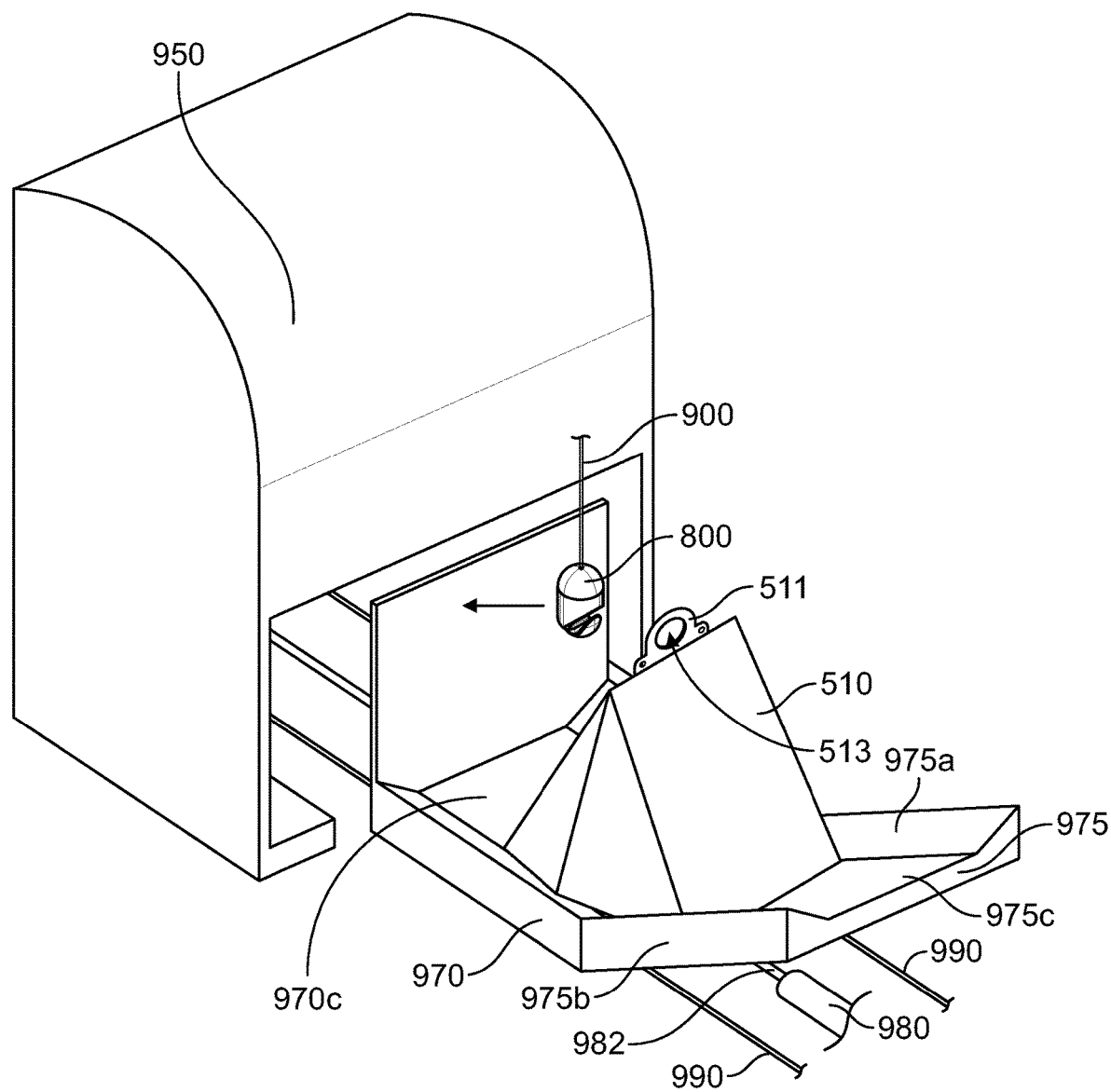
FIG. 10J is a perspective view of payload 510 positioned on payload support member 970 after payload retriever 800 has been lowered and moved out of engagement with handle 511 of payload 510.

FIG. 10I is a perspective view of payload 510 landing on chute 975 of payload support member 970 with hook or look 806 of payload retriever 800 still extended through aperture 513 of handle 511 of payload 510. FIG. 10J is a perspective view of payload retriever 800 which has been further lowered following touchdown of payload 510 on payload support member 970 such that hook or lip 806 or payload retriever 800 has been automatically disengaged from handle 511 of payload 510. Once disengaged from handle 511 of payload 510, payload retriever 800 may be winched back to the UAV and undertake the retrieval of another payload.

In addition, once payload 510 has landed on payload support member 970, payload 510 may be automatically moved to another position for further processing, thereby leaving payload support member 970 available for an additional payload to be positioned for retrieval, which could be performed by an automatic payload loader, or for leaving payload support member 970 available to receive the delivery of an additional payload.

Figure 11:
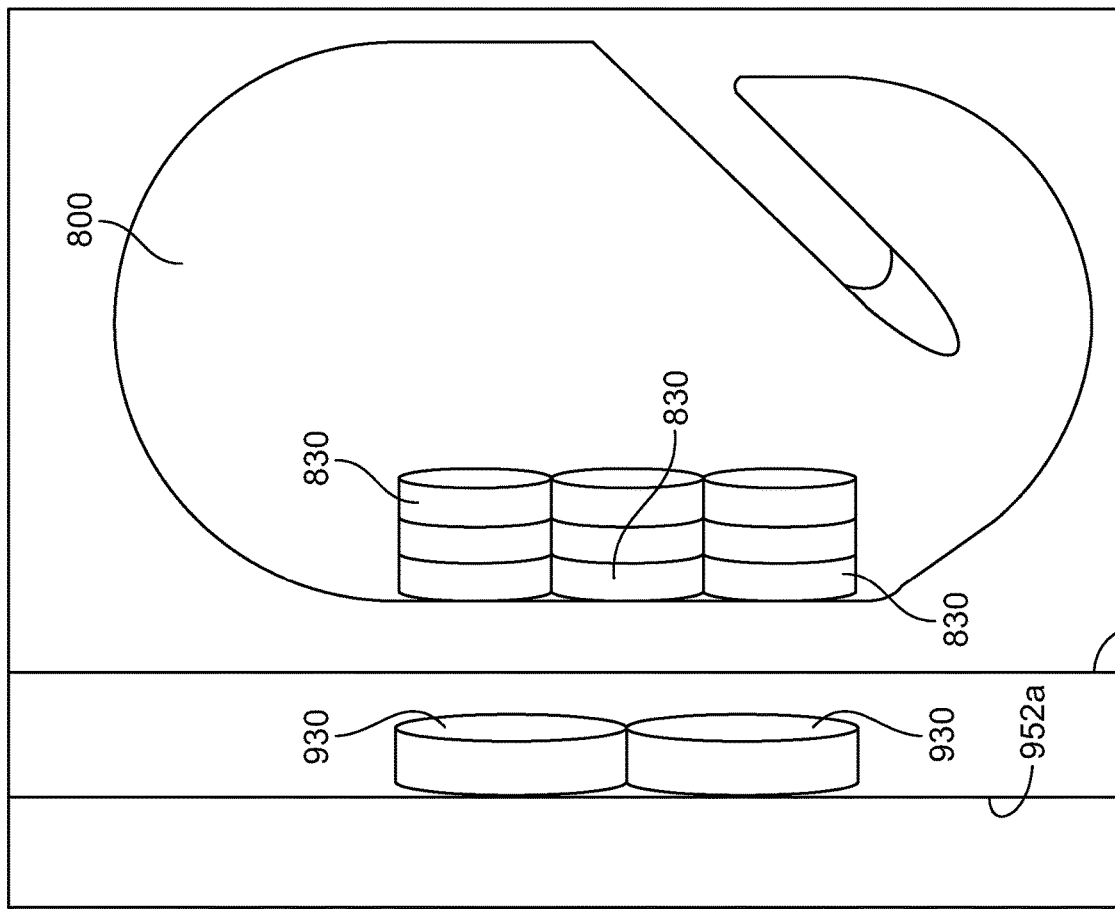
FIG. 11 is a side view of magnets 930 in outwardly facing portion 952 and magnets 830 in payload retriever 800, according to an example embodiment.

FIG. 11 is example embodiment showing the positioning of magnets 930 within outwardly facing wall 952 of payload retrieval apparatus 950, as well as payload retriever 800 having a plurality of magnets 830 just prior to coming into magnetic engagement with magnets 930. Magnets 930 may have a diameter of 12 mm and a thickness of 3 mm. In addition, magnets 830 are shown as a set of three stacks of magnets with each stack having three magnets, each of magnets 830 have a diameter of 6.3 mm and a thickness of 1.5 mm. The magnets may be neodymium magnets, although other types of magnets could also be used. FIG. 11 shows one example magnet configuration that could be used for magnets 930 and magnets 830. However, it will be appreciated that magnets of other configurations and geometries could be used as well. In addition, in FIG. 11, magnets 930 are shown positioned within outwardly facing portion 952 of payload retrieval apparatus 950. However, it will be appreciated that magnets 930 could be positioned on the front side or rear side 952a of outwardly facing portion 952, or flush within outwardly facing portion 952 such that they are exposed for magnetic engagement with magnets 830 of payload retriever 800. As the term is used herein, magnets positioned "on" or "thereon" outwardly facing portion 952 shall cover magnets positioned on the front or back side of outwardly facing portion 952 and magnets positioned wholly or partially within outwardly facing portion 952.

Figure 12:
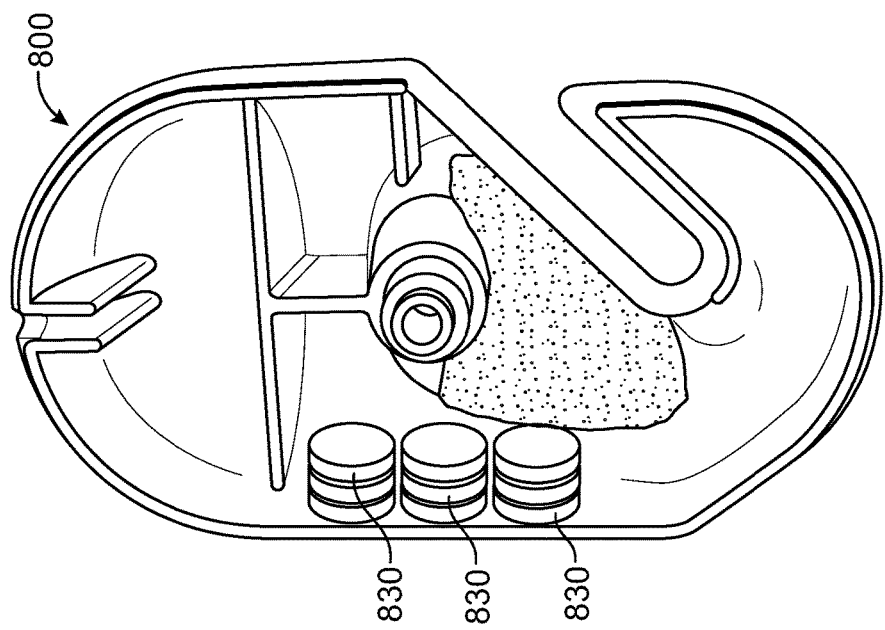
FIG. 12 is an open side view of payload retriever 800 with magnets 830 positioned therein, according to an example embodiment.

FIG. 12 is an example embodiment of payload retriever 800 having a plurality of magnets 830 positioned therein. In this example, the magnets 830 are positioned internally within payload retriever 800, although magnets 830 could also be positioned externally from payload retriever 800, or flush within the wall of payload retriever 800.

VI. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A payload retrieval apparatus comprising:
   a structure having an outwardly facing portion;
   a payload support member adapted for having a payload positioned thereon;
   one or more magnets or a metal positioned on or within the outwardly facing portion of the structure adapted to magnetically engage one or more magnets or a metal position on a payload retriever attached to a tether suspended from a UAV;
   wherein the one or more magnets or the metal are positioned on a side of the payload retriever opposite from a side having a slot positioned above a hook or lip of the payload retriever;

wherein when the payload is positioned on the payload support member, the payload support member is movable to position a handle of the payload adjacent the one or more magnets or the metal on or within the outwardly facing portion of the structure and into the slot of the payload retriever with the hook or lip of the payload retriever extending through an aperture in the handle of the payload.

2. The payload retrieval apparatus of claim 1, wherein the outwardly facing portion of the structure comprises a substantially vertical wall.

3. The payload retrieval apparatus of claim 1, wherein the payload support member is positioned on one or more guide rails.

4. The payload retrieval apparatus of claim 1, wherein the payload support member further includes a chute adapted to guide a payload into position on the payload support member during delivery of a payload.

5. The payload retrieval apparatus of claim 1, wherein the structure includes an opening; and the payload support member extends at least partially into the opening when the payload support member is moved to position the handle of the payload adjacent the outwardly facing portion of the structure.

6. The payload retrieval apparatus of claim 1, wherein the payload support member includes angled side walls adapted for engagement with angled surfaces the payload to align the payload into a desired position on the payload support member.

7. A system for payload retrieval comprising:
a payload retrieval apparatus comprising:
a structure having an outwardly facing portion;
a payload support member adapted for having a payload positioned thereon;
one or more magnets or a metal positioned on or within the outwardly facing portion of the structure magnetically engaged with one or more magnets or a metal positioned on a payload retriever attached to a tether suspended from a UAV, the payload retriever having a slot positioned above a hook or lip of the payload retriever;
wherein when the payload is positioned on the payload support member, the payload support member is movable to position a handle of the payload into the slot of the payload retriever with the hook or lip of the payload retriever extending through an aperture in the handle of the payload.

8. The system of claim 7, wherein one or more magnets are positioned on or within the outwardly facing portion of the structure magnetically engaged to a metal positioned on the payload retriever.

9. The system of claim 7, wherein the hook or lip of the payload retriever faces in the same direction as the outwardly facing portion of the payload retrieval apparatus when magnetically engaged thereto.

10. The system of claim 7, wherein a plurality of magnets are positioned on the outwardly facing portion of the structure, and a plurality of magnets are positioned on the payload retrieval apparatus.

11. The system of claim 7, wherein the handle of the payload is flexible and is adapted to flex when the handle is moved into engagement with the payload retriever.

12. The system of claim 7, wherein the structure includes an opening; and the payload support member extends at least partially into the opening when the payload support member is moved to position the handle of the payload within the slot of the payload retriever.

13. The system of claim 7, wherein the nagnetic engagement is adapted to be broken when the payload retriever is moved upwardly by the UAV.

14. A method of retrieving a payload with a UAV, comprising the steps of;
providing a payload retrieval apparatus having a structure having an outwardly facing portion, a payload support member, and one or more magnets or metal positioned on or within the outwardly facing portion of the structure;
positioning a payload having a handle with an aperture therein on the payload support member;
lowering a payload retriever attached to a tether suspended from the UAV, the payload retriever having one or more magnets or a metal adapted to magnetic engagement with the one or more magnets or the metal positioned on or within the outwardly facing portion of the structure;
causing the payload retriever to come into magnetic engagement with the outwardly facing portion of the structure;
moving the payload support member position the handle of the payload into a slot on the payload retriever with the hook or lip of the payload retriever extending through the aperture in the handle of the payload;
causing the payload retriever to move out of magnetic engagement with the outwardly facing portion of the structure; and
causing the payload retriever to move towards the UAV with the payload suspended from the payload retriever.

15. The method of claim 14, wherein one or more magnets are positioned on or within the outwardly facing portion of the structure adapted for magnetic engagement to a metal positioned on the payload retriever.

16. The method of claim 14, wherein the hook or lip of the payload retriever faces towards the handle of the payload when the payload retriever is magnetically engaged to the outwardly facing portion of the structure.

17. The method of clam 14, wherein a plurality of magnets are positioned on the outwardly facing portion of the structure, and a plurality of magnets are positioned on the payload retrieval apparatus.

18. The method of claim 14, wherein the payload support member includes angled side walls adapted for engagement with angled surfaces of the payload to align the payload into a desired position on the payload support member.

19. The method of claim 14, wherein the structure includes an opening; and the payload extends at least partially into the opening when the payload support member is moved to position the handle of the payload within the slot of the payload retriever.

20. The method of claim 14, wherein the handle of the payload is flexible, and the handle flexes as it moves into the slot of the payload retriever.

* * * * *